United States Patent [19]

Kawasaki et al.

[11] Patent Number: 5,633,317
[45] Date of Patent: May 27, 1997

[54] ISOCYANATE RESIN COMPOSITIONS AND HOT MELT AND PRESSURE SENSITIVE ADHESIVES BASED THEREON

[75] Inventors: Eiichi Kawasaki, Kanagawa-ken; Kiyoto Doi, Yamaguchi-ken; Tadashi Kitamura, Kanagawa-ken; Kousuke Suewaka, Kanagawa-ken; Kazuya Shinkoda, Kanagawa-ken, all of Japan

[73] Assignee: Mitsui Toatsu Chemicals, Inc., Tokyo, Japan

[21] Appl. No.: 301,934

[22] Filed: Sep. 7, 1994

Related U.S. Application Data

[60] Division of Ser. No. 2,870, Jan. 15, 1993, Pat. No. 5,418,288, which is a continuation-in-part of Ser. No. 914,342, Jul. 17, 1992, abandoned.

[30] Foreign Application Priority Data

| Jul. 18, 1991 | [JP] | Japan | 3-178272 |
| Nov. 1, 1991 | [JP] | Japan | 3-287667 |
| Feb. 4, 1992 | [JP] | Japan | 4-47964 |
| Nov. 27, 1992 | [JP] | Japan | 4-318820 |
| Nov. 27, 1992 | [JP] | Japan | 4-318821 |

[51] Int. Cl.$^6$ .................. C08L 51/00; C08L 75/04
[52] U.S. Cl. .................. 525/66; 525/64; 525/71; 525/77; 525/78; 525/79; 525/80
[58] Field of Search .................. 525/71, 74, 80, 525/78, 79, 293, 193, 194, 64, 66

[56] References Cited

U.S. PATENT DOCUMENTS

| 3,842,059 | 10/1974 | Milkovich et al. | 525/292 |
| 3,879,494 | 4/1975 | Milkovich et al. | 525/77 |
| 4,695,608 | 9/1987 | Eugler et al. | 525/308 |
| 4,788,256 | 11/1988 | Aoki et al. | 525/326.8 |
| 4,816,537 | 3/1989 | Tsuboniwa et al. | 526/301 |
| 4,990,583 | 2/1991 | Wamprecht et al. | 526/271 |
| 4,996,283 | 2/1991 | Greco et al. | 528/80 |
| 5,034,453 | 7/1991 | Takada et al. | 524/590 |
| 5,057,366 | 10/1991 | Husman et al. | 428/355 |

FOREIGN PATENT DOCUMENTS

| 0 130 323 | 1/1985 | European Pat. Off. . |
| 0 183 386 | 6/1986 | European Pat. Off. . |
| 0 293 602 | 12/1988 | European Pat. Off. . |
| 0 326 704 | 8/1989 | European Pat. Off. . |
| 0 328 962 | 8/1989 | European Pat. Off. . |
| 3-139584 | 6/1991 | Japan . |
| 4-31482 | 2/1992 | Japan . |

*Primary Examiner*—Mark L. Warzel
*Attorney, Agent, or Firm*—Millen, White, Zelano & Branigan, P.C.

[57] ABSTRACT

A resin composition containing graft copolymer having at least one isocyanate group and 10,000 to 20,000 number-average molecular weight or high-molecular-weight polymer having at least one isocyanate group and 10,000 to 200,000 number-average molecular weight, and low-molecular-weight polymer having or not having an isocyanate group and 500 to 8,000 number-average molecular weight. This resin composition has tackiness at ordinary temperature, and long pot life. It can be used for reactive hot melt type adhesives (which can omit hot press process), reactive hot melt type pressure-sensitive adhesives, or coating material.

16 Claims, No Drawings

ISOCYANATE RESIN COMPOSITIONS AND HOT MELT AND PRESSURE SENSITIVE ADHESIVES BASED THEREON

This application is a divisional of U.S. patent application Ser. No. 08/002,870, filed Jan. 15, 1993, now U.S. Pat. No. 5,418,288, which is a continuation-in-part application of U.S. patent application Ser. No. 07/914,342, filed on Jul. 17, 1992, now abandoned.

FIELD OF THE INVENTION

This invention relates to a resin composition comprising a graft copolymer or a high-molecular-weight polymer having an isocyanate group and a low-molecular-weight polymer having or not having an isocyanate group. More particularly, the present invention relates to a reactive hot-melt adhesive resin composition that is adapted to function as a hot-melt adhesive increased in pot life exhibiting satisfactory coating properties and having stickiness at a normal temperature in initial adhesion and adapted to carry out final adhesion by moisture-curing reaction with time. Further this invention relates to an acrylic reactive hot-melt pressure-sensitive adhesive resin composition which is adapted to function as a hot-melt adhesive exhibiting satisfactory coating properties in initial adhesion and change into sticky pressure-sensitive adhesive provided with satisfactory heat-resistant cohesion by moisture-curing reaction with time.

BACKGROUND OF THE INVENTION

Conventionally, an adhesive resin composition (hereinafter referred to as "adhesive composition") is generally classified as either a hot-melt adhesive composition or a reactive one.

It is well known in the art that hot-melt adhesive composition has satisfactory working and instantaneous adhesive properties, because it exhibits increased instantaneous adhesive force when it is applied using a hot-melt applicator after being melted by heating and then solidified by cooling. However, its adhesive power deteriorates at an elevated temperature, particularly at a temperature of 80° C. or higher.

Compositions for the hot-melt adhesive are typically disclosed in Japanese Patent Application (OPI) Nos. 25033/1974 and 90342/1976, Japanese Patent Publication No. 17514/1983, and Japanese Patent Application (OPI) Nos. 67772/1983, 147473/1983, 68385/1984, 158276/1982, and 28476/1985, and they include an ethylene-vinyl acetate resin composition; a polyolefin resin composition, such as a low density polyethylene resin composition or an atactic polypropylene one; a block polymer resin composition, such as an SIS resin composition or an SBS one, an SEBS one or the like; a butyl rubber resin composition; a polyester resin composition; a polyamide resin composition; and the like.

The hot-melt adhesive composition is widely applied to a variety of fields, including bookbinding, packaging, fabrics, furnitures, woodworking, light electrical appliances, transportation, and the like. However, it has a restriction on heat-resistant adhesion, so that it is merely recognized as a non-structural adhesive.

An adhesive composition exhibiting increased heat-resistance, wherein initial adhesion obtained at a state of hot-melt is kept effective, is desired, particularly in the field of product assembly. Unfortunately, the conventional hot-melt adhesive composition is not directed to such applications because it is highly deteriorated in adhesion at a high temperature.

The reactive adhesive composition is used as a structural adhesive, because it exhibits rigidity and adhesive strength at a high temperature. However, the reactive adhesive compositions widely known in the art, such as an epoxy adhesive composition, a urethane one, an acrylic one, or the like, are highly deteriorated in initial adhesion; therefore them is required to provide it with adhesion through a curing reaction. Unfortunately, this causes the period of time required for curing to be significantly increased.

In view of the foregoing, much effort has been directed to development of a reactive hot-melt adhesive composition which has characteristics of both the conventional hot-melt adhesion composition, such as initial adhesive properties and the like, and characteristics of the conventional reactive heat-resistant adhesive composition. For example, Japanese Patent Publication Nos. 518/1972 and 30898/1976 each disclose a reactive hot-melt adhesion composition that comprises ethylene-vinyl acetate resin, one kind of specified urethane prepolymer, and tackifier resin.

Also, Japanese Patent Application (OPI) Nos. 37936/1977 and 123436/1977, and Japanese Patent Publication No. 45954/1981, each disclose another reactive hot-melt adhesive composition, which comprises any one of polyethylene resin, polyester resin, ethylene-vinyl acetate resin, and ethylene-ethylacrylate resin, plus one kind of specified urethane prepolymer, and tackifier resin.

A further reactive hot-melt adhesive composition is disclosed in Japanese Patent Application (OPI) No. 120785/1988, which comprises a thermoplastic resin ingredient that mainly consists of a styrene block copolymer and a specified urethane prepolymer. The adhesive composition has initial adhesive properties provided by the thermoplastic resin ingredient based on the styrene block copolymer, toughness provided by the styrene block copolymer, and heat-resistant adhesive properties and elasticity provided by a cured urethane prepolymer comprising a combination of an unsaturated hydrocarbon polyol and polyoxybutylene glycol. The reactive hot-melt adhesive composition thus prepared exhibits initial adhesion through the thermoplastic resin acting as a base polymer, and it provides rigidity at an elevated temperature by urethane reaction that occurs over time. Nevertheless, the adhesive composition generally fails to exhibit satisfactory initial adhesive properties and heat-resistance.

Still another reactive hot-melt adhesive composition is disclosed in each of Japanese Patent Application (OPI) Nos. 181375/1987 and 14287/1989, which composition comprises a polyurethane prepolymer that is solid or crystalline at a normal temperature. Unfortunately, the composition is decreased in initial adhesive properties and substantially varied in melting viscosity during coating.

Thus, there has not yet been developed a reactive hot-melt adhesive composition of the moisture-curing type that is capable of satisfying demands in the market. Accordingly, it is highly desirable to provide a reactive hot-melt adhesive composition that minimizes the variation in melting viscosity prior to moisture-curing; that exhibits good hot-melt coating properties; that provides tackiness at a normal temperature; that ensures an increased pot life at a normal temperature; that provides satisfactory initial adhesive properties; and that exhibits increased heat-resistance after moisture-curing.

An acrylic pressure-sensitive adhesive is directed to various applications, such as pressure-sensitive labels, pressure-sensitive sheets, pressure-sensitive tapes, and the like, because of its improved weather-resistance, resistance to deterioration and stickiness. The acrylic pressure-sensitive adhesives that are currently widely used include solvent-type acrylic pressure-sensitive adhesives and emulsion-type ones.

For a hot-melt pressure-sensitive adhesive, a composition containing a styrene-isoprene-styrene block copolymer as a base polymer is currently used. However, the adhesive is deteriorated in weather-resistance and resistance to deterioration.

Some attempts have been made to develop a hot-melt-type acrylic pressure-sensitive adhesive as the demand for a non-solvent-type pressure-sensitive adhesive has increased. However, an acrylic hot-melt pressure-sensitive adhesive disclosed in, for example, each of Japanese Patent Application (OPI) Nos. 75975/1984, 125774/1983, 161484/1981, and 315409/1989, generally fails to exhibit satisfactory hot-melt coating properties and cohesion.

In order to eliminate the foregoing disadvantage, a hot-melt pressure-sensitive adhesive of the type that is cured by activation energy beams is proposed, as disclosed in Japanese Patent Application (OPI) Nos. 276879/1990, 119082/1991 and 220375/1991. Unfortunately, the proposed adhesive has a disadvantage that when post-crosslinking is carried out using electron beams in order to increase cohesion of the adhesive, specific equipment is needed for the irradiation of electron beams, resulting in on-site workability being deteriorated.

A moisture-curing hot-melt adhesive composition is disclosed in Japanese Patent Application (OPI) No. 259984/1991, which comprises alkyl (metha)acrylate, macromer (polymer-like monomer), (metha)acrylate having a silyl group, and an isocyanated compound. However, the adhesive composition has a drawback in hot-melt coating prior to moisture-curing. In particular, workability is substantially restricted by toxic gas produced from the isocyanate compound during melting at a high temperature.

In this specification and claims "(metha)acrylate" and "(metha)acrylic" mean acrylate or methacrylate and acrylic or methacrylic.

A moisture-curing adhesive composition is disclosed in Japanese Patent Application (OPI) No. 139584/1991, which comprises alkyl (metha)acrylate, a polymerizable polymer, and unsaturated isocyanate. The adhesive composition has a disadvantage in that its melting viscosity is substantially varied. In order to improve the disadvantage, a moisture-curing hot-melt adhesive composition which comprises alkyl (metha)acrylate, a polymerizable polymer, unsaturated isocyanate, an organic tin compound, and an organic phosphoric compound is proposed, as disclosed in Japanese Patent Application (OPI) No. 31482/1992. However, addition of an organic phosphoric compound for restricting the variation in melting viscosity causes moisture-curing of the adhesive to be delayed. Moreover, Japanese Patent Application (OPI) Nos. 139584/1991 and 31482/1992 each disclose a graft copolymer. However, sole use of the graft copolymer does not exhibit sufficient initial adhesive properties and initial cohesion prior to moisture-curing when the melting viscosity is adjusted to an appropriate level (100,000 cps or less) at a relatively low temperature (about 120° C.) in order to provide the copolymer with satisfactory hot-melt coating properties.

Thus, there has not yet been provided an acrylic hot-melt pressure-sensitive composition that satisfies demands in the market. Accordingly, it is highly desirable to develop a hot-melt adhesive composition that minimizes the variation in melting viscosity prior to moisture-curing; that exhibits good hot-melt coating properties; that provides satisfactory initial cohesion; and that exhibits increased heat-resistant cohesion after moisture-curing.

SUMMARY OF THE INVENTION

It is an object of the present invention to provide a novel reactive hot-melt adhesive composition that is capable of ensuring the initial adhesion characteristic of hot-melt during heat fusion coating by a conventional applicator, and that accomplishes moisture-curing of the hot-melt after coating and contact bonding, resulting in the composition being used as a semi-structural or structural adhesive.

It is another object of the present invention to provide a reactive hot-melt adhesive composition that is capable of minimizing the change in melting viscosity prior to moisture-curing, exhibiting good hot-melt coating properties (b), increased stickiness at a normal temperature (c), an increased pot life at a normal temperature and (d) satisfactory initial adhesive properties; and that exhibits increased heat-resistance after moisture-curing.

It is a further object of the present invention to provide a hot-melt adhesive composition that is capable of suppressing the change in melting viscosity prior to moisture-curing; that exhibits good hot-melt coating properties; that provides satisfactory initial cohesion; and that changes into a sticky pressure-sensitive adhesive with increased heat-resistant cohesion after moisture-curing.

Other and further objects, features, and advantages of the invention will appear more fully from the following description.

DETAILED DESCRIPTION OF THE INVENTION

The above-described objects of the present invention are attained by resin compositions described hereinafter.

(1) A resin composition which comprises 10 to 90 parts by weight of at least one polymer selected from graft copolymers $A_1$ to $A_5$, shown below, having at least one isocyanate group and 10,000 to 200,000 number-average molecular weight, and 90 to 10 parts by weight of at least one polymer selected from low-molecular-weight polymers $E_1$ to $E_3$, shown below, having at least one isocyanate group and 500 to 8,000 number-average molecular weight:

1) graft copolymers $A_1$ to $A_5$;
   1-1) graft copolymer $A_1$ having at least one isocyanate group prepared by graft polymerizing a monomer (c) having a vinyl group and an isocyanate group in the molecule on a thermoplastic resin (f);
   1-2) graft copolymer $A_2$ having at least one isocyanate group prepared by copolymerizing a monomer (c) having a vinyl group and an isocyanate group in the molecule, a macromer (a) having a vinyl group at the end of molecule, having more than 2,000 number-average molecular weight and above 20° C. glass transition temperature, and an alkyl (metha)acrylate (b) having 1 to 12 carbon atoms in the alkyl group, and, having −75° C. to −20° C. glass transition temperature of alkyl (metha)acrylate portion;
   1-3) graft copolymer $A_3$ having at least one isocyanate group prepared by copolymerizing a monomer (h) having a vinyl group and an active hydrogen in the molecule, above described macromer (a), and alkyl (metha)acrylate (b) having 1 to 12 carbon atoms in the alkyl group, and further reacting with a polyisocyanate (d), and having −75° C. to −20° C. of glass transition temperature of alkyl (metha)acrylate portion;

1-4) graft copolymer $A_4$ having at least one isocyanate group prepared by copolymerizing a monomer (c) having a vinyl group and an isocyanate group in the molecule and alkyl (metha)acrylate (b) having 1 to 12 carbon atoms in the alkyl group, in the presence of a thermoplastic resin (f), and having $-75°$ C. to $-20°$ C. glass transition temperature of alkyl (metha)acrylate portion;

1-5) graft copolymer $A_5$ having at least one isocyanate group prepared by copolymerizing a monomer (h) having a vinyl group and an active hydrogen in the molecule and alkyl (metha)acrylate (b) having 1 to 12 carbon atoms in the alkyl group in the presence of said thermoplastic resin (f), and further reacting with a polyisocyanate (d), and having $-75°$ C. to $-20°$ C. of glass transition temperature of alkyl (metha)acrylate portion;

2) low-molecular-weight polymer $E_1$ to $E_3$;

2-1) low-molecular-weight polymer $E_1$ having at least one isocyanate group prepared by reacting above-described monomer (c), at least one monomer (g) selected from vinyl acetate and alkyl (metha)acrylate (b) having 1 to 12 carbon atoms in the alkyl group, and having $-40°$ C. to $100°$ C. glass transition temperature;

2-2) low-molecular-weight polymer $E_2$ having at least one isocyanate group prepared by graft polymerizing above-described monomer (c) on at least one resin selected from a petroleum resin, hydrogenated petroleum resin, terpene resin, or hydrogenated terpene resin, and, having $-20°$ C. to $100°$ C. glass transition temperature;

2-3) low-molecular-weight polymer $E_3$ having at least one isocyanate group prepared by copolymerizing above-described monomer (h) and at least one monomer (g) selected from vinyl acetate and above-described monomer (b), and then reacting this copolymer with polyisocyanate (d), and having $-40°$ C. to $100°$ C. glass transition temperature.

(2) A resin composition which comprises 50 to 90 parts by weight of at least one polymer selected from graft copolymers (A), shown below, having at least one isocyanate group and 10,000 to 200,000 of number-average molecular weight, and 50 to 10 parts by weight of a low-molecular-weight polymer (B), shown below, not having an isocyanate group and having 500 to 8,000 of number-average molecular weight:

1) graft copolymers (A): $A_2$ to $A_5$;

1-1) graft copolymer $A_2$ having at least one isocyanate group prepared by copolymerizing a monomer (c) having a vinyl group and an isocyanate group in the molecule, a macromer (a) having a vinyl group at the end of the molecule, having more than 2,000 number-average molecular weight and above $20°$ C. glass transition temperature, and an alkyl (metha)acrylate (b) having 1 to 12 carbon atoms of alkyl group, and, having $-75°$ C. to $-20°$ C. glass transition temperature of alkyl (metha)acrylate portion;

1-2) graft copolymer $A_3$ having at least one isocyanate group prepared by copolymerizing a monomer (h) having a vinyl group and an active hydrogen in the molecule, a macromer (a) having a vinyl group at the end of the molecule, having more than 2,000 number-average molecular weight and above $20°$ C. glass transition temperature, and alkyl (metha)acrylate (b) having 1 to 12 carbon atoms in the alkyl group, and further reacting with a polyisocyanate (d), and having $-75°$ C. to $-20°$ C. of glass transition temperature in the alkyl (metha)acrylate portion;

1-3) graft copolymer $A_4$ having at least one isocyanate group prepared by copolymerizing a monomer (c) having a vinyl group and an isocyanate group in the molecule and alkyl (metha)acrylate (b) having 1 to 12 carbon atoms in the alkyl group, in the presence of a thermoplastic resin (f), and having $-75°$ C. to $-20°$ C. glass transition temperature of alkyl (metha)acrylate portion;

1-4) graft copolymer $A_5$ having at least one isocyanate group prepared by copolymerizing a monomer (h) having a vinyl group and an active hydrogen in the molecule and alkyl (metha)acrylate (b) having 1 to 12 carbon atoms in the alkyl group in the presence of said thermoplastic resin (f), and further reacting with a polyisocyanate (d), and having $-75°$ C. to $-20°$ C. of glass transition temperature in the alkyl (metha)acrylate portion;

2) low-molecular-weight polymer (B);

low-molecular-weight polymer (B) not having an isocyanate group prepared by polymerizing at least one monomer (g) selected from vinyl acetate and alkyl (metha)acrylate (b) having 1 to 12 carbon atoms in the alkyl group, and having $-40°$ C. to $80°$ C. glass transition temperature.

(3) A resin composition which comprises 40 to 90 parts by weight of at least one polymer selected from high-molecular-weight polymers (D), shown below, having at least one isocyanate group and 10,000 to 200,000 number-average molecular weight, and 60 to 10 parts by weight of at least one polymer selected from low-molecular-weight polymers (E) or (B), shown below, having or not having an isocyanate group and 500 to 8,000 number-average molecular weight:

1) high-molecular-weight polymer (D);

1-1) high-molecular-weight polymer $D_1$ having at least one isocyanate group prepared by copolymerizing a monomer (c) having a vinyl group and an isocyanate group in the molecule and alkyl (metha)acrylate (b) having 1 to 12 carbon atoms in the alkyl group, and having $-75°$ C. to $-20°$ C. glass transition temperature of alkyl (metha)acrylate portion;

1-2) high-molecular-weight polymer $D_2$ having at least one isocyanate group prepared by copolymerizing a monomer (h) having a vinyl group and an active hydrogen in the molecule and an alkyl (metha)acrylate (b) having 1 to 12 carbon atoms in the alkyl group, and further reacting with a polyisocyanate (d), and having $-75°$ C. to $-20°$ C. glass transition temperature of alkyl (metha)acrylate portion;

2) low-molecular-weight polymer;

2-1) low-molecular-weight polymer $E_1$ having at least one isocyanate group prepared by copolymerizing a monomer (c) having a vinyl group and an isocyanate group in the molecule and at least one monomer (g) selected from vinyl acetate and alkyl (metha)acrylate (b) having 1 to 12 carbon atoms in the alkyl group, and having $-40°$ C. to $100°$ C. glass transition temperature;

2-2) low-molecular-weight polymer $E_3$ having at least one isocyanate group prepared by copolymerizing a monomer (h) having a vinyl group and an active hydrogen in the molecule and at least one monomer (g) selected from vinyl acetate and alkyl (metha)acrylate (b) having 1 to 12 carbon atoms in the alkyl group, and then reacting this copolymer with polyisocyanate (d), and having −40° C. to 100° C. glass transition temperature.

2-3) low-molecular-weight polymer B not having an isocyanate group prepared by polymerizing at least one monomer (g) selected from vinyl acetate and alkyl (metha)acrylate (b) having 1 to 12 carbon atoms in the alkyl group, having −40° C. to 80° C. glass transition temperature.

(4) The resin composition as stated in above (1), wherein the graft copolymer having at least one isocyanate group has an isocyanate group content of 0.01 to 10% by weight, and the low-molecular-weight polymer having at least one isocyanate group has an isocyanate group content of 0.02 to 10% by weight.

(5) The resin composition as stated in above (1), wherein the graft copolymer having at least one isocyanate group is graft copolymer $A_2$, that is prepared by copolymerizing 0.05 to 40% by weight of said monomer (c) having a vinyl group and an isocyanate group in the molecule, 2 to 50% by weight of said macromer (a), and 97.95 to 30% by weight of said alkyl (metha)acrylate (b) of which an alkyl group has 1 to 12 carbon atoms.

(6) The resin composition as stated in above (1), wherein the graft copolymer having at least one isocyanate group is graft copolymer $A_3$, that is prepared by copolymerizing 0.05 to 40% by weight of said monomer (h) having a vinyl group and an active hydrogen in the molecule, 2 to 50% by weight of said macromer (a), and 97.85 to 30% by weight of said alkyl (metha)acrylate (b) of which an alkyl group has 1 to 12 carbon atoms, and then reacting the resultant copolymer with 0.1 to 50% by weight polyisocyanate (d).

(7) The resin composition as stated in above (1), wherein the graft copolymer having at least one isocyanate group is graft copolymer $A_4$, that is prepared by copolymerizing 0.05 to 40% by weight of said monomer (c) having a vinyl group and an isocyanate group in the molecule and 96.95 to 30% by weight of said alkyl (metha)acrylate (b) of which an alkyl group has 1 to 12 carbon atoms, in the presence of 3 to 50% by weight of said thermoplastic resin (f).

(8) The resin composition as stated in above (1), wherein the graft copolymer having at least one isocyanate group is graft copolymer $A_5$, that is prepared by copolymerizing 0.05 to 40% by weight of said monomer (h) having a vinyl group and active hydrogen in the molecule and 96.85 to 30% by weight of said alkyl (metha)acrylate (b) of which an alkyl group has 1 to 12 carbon atoms, in the presence of 3 to 50% by weight of thermoplastic resin (f) and then reacting the resultant copolymer with 0.1 to 50% by weight of said polyisocyanate (d).

(9) The resin composition as stated in above (1), wherein the low-molecular-weight polymer having at least one isocyanate group is low-molecular-weight polymer $E_1$, that is prepared by copolymerizing 0.05 to 50% by weight of said monomer (c) having a vinyl group and an isocyanate group in the molecule and 99.95 to 50% by weight of at least one monomer selected from the group consisting of vinyl acetate and said alkyl (metha)acrylate (b).

(10) The resin composition as stated in above (1), wherein the low-molecular-weight polymer having at least one isocyanate group is low-molecular-weight polymer $E_3$, that is prepared by copolymerizing 0.05 to 50% by weight of said monomer (h) having a vinyl group and an active hydrogen in the molecule, and 99.85 to 30% by weight of at least one monomer selected from the group consisting of vinyl acetate, and said alkyl (metha)acrylate (b), and then reacting the resultant copolymer with 0.1 to 50% by weight of said polyisocyanate (d).

(11) The resin composition as stated in above (3), wherein the high-molecular-weight polymer $D_1$ having at least one isocyanate group is prepared by copolymerizing 0.05 to 10% by weight of monomer (c), having a vinyl group and an isocyanate group in the molecule, and 99.95 to 90% by weight of alkyl (metha)acrylate (b) having 1 to 12 carbon atoms of alkyl group.

(12) The resin composition as stated in above (3), wherein the high-molecular-weight polymer $D_2$ having at least one isocyanate group is prepared by copolymerizing 0.05 to 10% by weight of monomer (h), having a vinyl group and an active hydrogen in the molecule, and 99.85 to 70% by weight of alkyl (metha)acrylate (b) having 1 to 12 carbon atoms of alkyl group, and then reacting the resultant copolymer with 0.1 to 20% by weight of said polyisocyanate (d).

Herein, the graft polymer (A) is a copolymer $A_1$ obtained by reacting a monomer (c) with a thermoplastic resin (polymer) (f) or a copolymer $A_2$, $A_3$, $A_4$, or $A_5$ composed of a main backbone chain to which side chains containing different atomic constituents are attached at various points. The high-molecular-weight polymer (D) is a random copolymer.

An adhesive can be prepared by mixing a solution of the present graft copolymer (A) having at least one isocyanate group or the present high-molecular-weight polymer (D) having at least one isocyanate group, in a predetermined amount, and a solution of the present low-molecular-weight polymer (E) having at least one isocyanate group or/and the present low-molecular-weight polymer (B) not having an isocyanate group, in a predetermined amount, and then removing a solvent from the mixture.

In the resin composition of the present invention, the combination of copolymers A and E or/and B, polymers D and B or/and E is not limited to any specific combination. However, the combination is preferably selected from the group consisting of $A_1$ and $E_1$, $A_1$ and $E_2$, $A_2$ and $E_1$, $A_2$ and $E_2$, $A_2$ and $E_3$, $A_3$ and $E_1$, $A_3$ and $E_3$, $A_4$ and $E_1$, $A_4$ and $E_3$, $A_5$ and $E_1$, $A_5$ and $E_3$, $A_4$ and $E_2$; $A_2$, $A_4$ and $E_1$; $A_2$, $A_4$ and $E_2$; and $A_2$, $A_4$ and $E_1$, $E_2$; $A_2$ and B, $A_4$ and B, $D_1$ and $E_1$, $D_1$ and B; $A_2$, $E_1$, and B; $A_4$, $E_1$, and B; and $D_1$, $E_1$, and B.

The graft copolymer (A) having at least one isocyanate group has a number-average molecular weight of 10,000 to 200,000, preferably 10,000 to 150,000, and more preferably 10,000 to 100,000. A number-average molecular weight below 10,000 causes cohesion of the adhesive to be insufficient, resulting in the adhesive failing to exhibit satisfactory initial adhesive properties, or resulting in insufficient heat-resistant retention force after curing; whereas a number-average molecular weight above 200,000 causes the melting viscosity of the adhesive to be excessive, which deteriorates the coating properties of the adhesive.

The alkyl (metha)acrylate portion of each of the graft copolymers $A_2$ to $A_5$ has a glass transition temperature of −75° C. to −20° C., preferably −70° C. to −20° C., and more preferably −70° C. to −30° C. A glass transition temperature below −75° C. causes insufficient cohesion of the adhesive, whereas one above −20° C. causes the stickiness of the adhesive at a normal temperature prior to curing to be insufficient, or causes the adhesive force after curing to be insufficient. The glass transition temperature can be measured using a differential scanning calorimeter (DSC).

In the present invention, the graft copolymer (A) having at least one isocyanate group has an isocyanate group content of preferably 0.01 to 10% by weight, more preferably 0.02 to 8% by weight, and most preferably 0.04 to 5% by weight. A shortage of the isocyanate content causes insufficiency of heat-resistant adhesive properties after moisture-curing, whereas an excess of the isocyanate content results in the adhesive cured due to moisture-curing being fragile, leading to a shortage of adhesion.

The low-molecular-weight polymer (E) having at least one isocyanate group has a number-average molecular weight of 500 to 8,000, preferably 1,000 to 8,000, and more preferably 1,000 to 7,000. A number-average molecular weight less than 500 causes cohesion of the adhesive to be insufficient, resulting in unsatisfactory initial adhesive properties, or resulting in insufficient heat-resistant retention force, whereas one more than 8,000 causes the melting viscosity of the adhesive to be excessive, leading to a failure in coating properties. Also, with respect to the glass transition temperature, Tg, of the low-molecular-weight polymer (E) having at least one isocyanate group of the present invention, $E_1$ and $E_3$ have a Tg of $-40°$ C. to $100°$ C., preferably $-20°$ C. to $100°$ C., and $E_2$ has a Tg of $-20°$ C. to $100°$ C., preferably $-20°$ C. to $80°$ C. A glass transition temperature below $-40°$ C. causes cohesion of the adhesion to be insufficient, whereas one above than $100°$ C. leads to a insufficient stickiness of the adhesion at a normal temperature before curing.

In the present invention, the low-molecular-weight polymer (E) having at least one isocyanate group has an isocyanate group content of preferably 0.02 to 10% by weight, more preferably 0.1 to 8% by weight, and most preferably 0.2 to 5% by weight. A shortage of the isocyanate content leads to insufficient heat-resistant cohesion of the adhesive, whereas an excess thereof causes the adhesive cured by moisture-curing to be fragile, resulting in the adhesion being insufficient.

The words "isocyanate content" used herein indicate the NCO-group content (% by weight) in the copolymer or polymer based on a total weight thereof.

In the present invention, 10 to 90 parts by weight of graft copolymer (A) having at least one isocyanate, and 90 to 10 parts by weight of low-molecular-weight polymer (E) having at least one isocyanate group, are combined. A ratio by weight of the graft copolymer having at least one isocyanate group: the low-molecular-weight polymer (E) having at least one isocyanate group is preferably 20–80:80–20, more preferably 30–70:70–30. An amount of graft copolymer (A) having at least one isocyanate group less than 10 parts by weight causes cohesion of the adhesive to be insufficient, whereas an amount more than 90 parts by weight causes excessive melting viscosity of the adhesive, leading to deterioration in coating properties of the adhesive.

The number-average molecular weight of low-molecular-weight polymer (B) not having an isocyanate group to be used in the present invention is generally 500 to 8,000, preferably 500 to 7,000, more preferably 500 to 6,000. A number-average molecular weight less than 500 causes cohesion of the adhesive to be insufficient and heat-resistant holding property to be insufficient, whereas one more than 8,000 causes the melting viscosity of the pressure-sensitive adhesive to be excessive, leading to a failure in coating properties.

The glass transition temperature, Tg, of low-molecular-weight polymer (B) not having an isocyanate group to be used in the present invention is generally $-40°$ C. to $80°$ C., preferably $-30°$ C. to $70°$ C. more preferably $-20°$ C. to $60°$ C. A Tg below $-40°$ C. causes cohesion of the adhesive to be insufficient, whereas one above $80°$ C. leads to an insufficient adhesive force.

In the present invention, 50 to 90 parts by weight of above-mentioned graft copolymer (A) having at least one isocyanate group, 50 to 10 parts by weight of low-molecular-weight polymer (B) not having an isocyanate group is added and combined.

A ratio by weight of the graft copolymer (A) having at least one isocyanate group: the low-molecular-weight polymer (B) not having an isocyanate group is preferably 60–90:40–10, more preferably 60–80:40–20. An amount of graft polymer (A) having at least one isocyanate group less than 50 parts by weight causes cohesion of the adhesive to be insufficient, whereas an amount more than 90 parts by weight causes excessive melting viscosity of the adhesive, leading to failure in coating properties.

The number-average molecular weight of high-molecular-weight polymer (D) having at least one isocyanate group to be used in the present invention is generally 10,000 to 200,000, preferably 10,000 to 150,000, more preferably 10,000 to 100,000. A number-average molecular weight less than 10,000 causes cohesion of the adhesive to be insufficient and heat-resistant holding property after curing to be insufficient, whereas one more than 200,000 causes the melting viscosity of the pressure-sensitive adhesive to be excessive, leading to a failure in coating properties.

The glass transition temperature of high-molecular-weight polymer (D) having at least one isocyanate group to be used in the present invention is generally $-75°$ C. to $-20°$ C., preferably $-70°$ C. to $-20°$ C., more preferably $-70°$ C. to $-30°$ C. The glass transition temperature below $-75°$ C. causes cohesion of the adhesive to be insufficient, whereas one above $-20°$ C. leads to an insufficient adhesive force after curing.

In the present invention, 40 to 90 parts by weight of above-mentioned high-molecular-weight polymer (D) having at least one isocyanate group, 60 to 10 parts by weight of low-molecular-weight polymer (E) having at least one isocyanate group or low-molecular-weight polymer (B) not having an isocyanate group is added and combined.

A ratio by weight of the high-molecular-weight polymer (D) having at least one isocyanate group: the low-molecular-weight polymer (E) having at least one isocyanate group or low-molecular-weight polymer (B) not having an isocyanate group is preferably 50–90:50–10, more preferably 50–80:50–20.

An amount of said high-molecular-weight polymer (D) having at least one isocyanate group less than 40 parts by weight causes cohesion of the adhesive to be insufficient, whereas an amount more than 90 parts by weight causes excessive melting viscosity of the adhesive, leading to failure in coating properties.

Now preparation of the graft copolymers $A_1$ to $A_5$ having at least one isocyanate group will be described hereinafter.

The copolymer $A_1$ can be prepared by graft-polymerizing the monomer (c), having a vinyl group and an isocyanate group in its molecule, on the thermoplastic resin (f). More particularly, the thermoplastic resin (f) is melted together with the monomer (c) and an organic peroxide, above a softening point or melting point of the resin (f) and above a decomposition temperature of the organic peroxide in an extruder or a kneader, leading to graft polymerization between the monomer and the resin.

The graft copolymer $A_2$ can be prepared by copolymerizing the monomer (c) having a vinyl group and an isocyanate group in its molecule, with the macromer (a) having a vinyl group at a terminal end of its molecule and having a number-average molecular weight of 2,000 or more, and a glass transition temperature of $20°$ C. or more, and the alkyl (metha)acrylate (b) whose alkyl group has 1 to 12 carbon atoms, normally, by solution polymerization, in a solvent, in the presence of a polymerization initiator.

The graft copolymer $A_3$ can be prepared By copolymerizing the monomer (h) having a vinyl group and active hydrogen that will react with an isocyanate group in its molecule, said macromer (a), and the alkyl (metha)acrylate (b) whose alkyl group contains 1 to 12 carbon atoms, normally, by solution polymerization, in a solvent, in the presence of a polymerization initiator, and then reacting the resultant copolymer with polyisocyanate (d).

The ingredients for the graft copolymer $A_2$ are used in amounts such that the monomer (c) is 0.05 to 40% by weight, the macromer (a) is 2 to 50% by weight, and the alkyl (metha)acrylate (b), whose alkyl group has 1 to 12 carbon atoms, is 97.95 to 30% by weight.

The ingredients for the graft copolymer $A_3$ are used in amounts such that the monomer (h) is 0.05 to 40% by weight, the macromer (a) is 2 to 50% by weight, the alkyl (metha)acrylate (b), whose alkyl group has 1 to 12 carbon atoms, is 97.85 to 30% by weight, and the polyisocyanate (d) is 0.1 to 50%.

The graft copolymer $A_4$ may be prepared by copolymerizing the monomer (c) having a vinyl group and an isocyanate group in its molecule and the alkyl (metha)acrylate (b), whose alkyl group contains 1 to 12 carbon atoms. This is normally done by solution polymerization in a solution prepared by dissolving the thermoplastic resin (f) in a solvent in the presence of a polymerization initiator.

The graft copolymer $A_5$ may be prepared by copolymerizing the monomer (h) having a vinyl group and active hydrogen that will react with an isocyanate group in its molecule and the alkyl (metha)acrylate (b) whose alkyl group contains 1 to 12 carbon atoms, normally, by solution polymerization in a solution prepared by dissolving the thermoplastic resin (f) in a solvent, in the presence of a polymerization initiator, and then reacting the resultant copolymer with polyisocyanate (d).

The ingredients for the graft copolymer $A_4$ are preferably used in such amounts that the thermoplastic resin (f) is 3 to 50% by weight, the monomer (c), having a vinyl group and an isocyanate group in the molecule, is 0.05 to 40% by weight, and the alkyl (metha)acrylate (b), whose alkyl group conveniently has 1 to 12 carbon atoms, is 96.95 to 30% by weight.

The ingredients for the graft copolymer $A_5$ are conveniently used in such amounts that the thermoplastic resin (f) is 3 to 50% by weight, the monomer (h), having a vinyl group and active hydrogen reacting with an isocyanate group in the molecule, is 0.05 to 40% by weight, and the alkyl (metha)acrylate (b), whose alkyl group conveniently has 1 to 12 carbon atoms, is 96.85 to 30% by weight and polyisocyanate (d) is 0.1 to 50% by weight.

Now preparation of the isocyanate group containing low-molecular-weight polymers $E_1$ to $E_3$ will be described hereinafter.

The low-molecular-weight polymer $E_1$ can be prepared by copolymerizing the monomer (c), at least one monomer (g) selected from the group consisting of vinyl acetate, and the alkyl (metha)acrylate (b), whose alkyl group has 1 to 12 carbon atoms, usually by solution polymerization in a solvent in the presence of a polymerization initiator.

Particularly preferably, the ingredients for the low-molecular-weight polymer $E_1$ are conveniently used in such amounts that the monomer (c), having a vinyl group and an isocyanate group in its molecule, is 0.05 to 50% by weight, and at least one monomer (g), selected from vinyl acetate and alkyl (metha)acrylate, is 99.95 to 50% by weight.

The low-molecular-weight polymer $E_2$ can be prepared by graft polymerizing said monomer (c) on at least one resin (i) selected from the group consisting of petroleum resin, hydrogenated petroleum resin, terpene resin, and hydrogenated terpene resin. More particularly, it may be prepared by mixing the monomer (c) with petroleum resin, (hydrogenated) petroleum resin or terpene resin, (hydrogenated) terpene resin, normally in the presence of said organic peroxide at a decomposition temperature of the organic peroxide and a softening temperature of the resin or more.

The low-molecular-weight polymer $E_3$ can be prepared by copolymerizing said monomer (h) and at least one monomer (g) selected from the group consisting of vinyl acetate and the alkyl (metha)acrylate, whose alkyl group contains 1 to 12 carbon atoms, normally by solution polymerization in a solvent, in the presence of a polymerization initiator, followed by reaction of the resultant copolymer with polyisocyanate (d).

The ingredients for the low-molecular-weight polymer $E_3$ are conveniently used in such amounts that the monomer (h), having a vinyl group and active hydrogen that will react with an isocyanate group in the molecule, is 0.05 to 50 parts by weight, and at least one monomer (g), selected from vinyl acetate and alkyl (metha)acrylate, is 99.85 to 30% by weight, and the polyisocyanate (d) is 0.1 to 50% by weight.

The low-molecular-weight polymer (B) can be prepared by polymerizing at least one monomer (g) selected from the group consisting of vinyl acetate and the alkyl (metha) acrylate (b), whose alkyl group has 1 to 12 carbon atoms, usually by solution polymerization in a solvent in the presence of a polymerization initiator.

The solution of graft copolymer (A) having at least one isocyanate group, prepared as shown above, and the solution of low-molecular-weight polymer (B) not having an isocyanate group, each in a prescribed amount, are mixed, and the solvent is removed, to prepare a adhesive.

The high-molecular-weight polymer $(D_1)$ can be prepared by copolymerizing a monomer (c) having a vinyl group and an isocyanate group in the molecule and an alkyl (metha) acrylate (b), whose alkyl group has 1 to 12 carbon atoms, usually by solution polymerization in a solvent in the presence of a polymerization initiator.

The high-molecular-weight polymer $(D_2)$ can be prepared by copolymerizing a monomer (h) having a vinyl group and an active hydrogen in the molecule and an alkyl (metha) acrylate (b), whose alkyl group has 1 to 12 carbon atoms, usually by solution polymerization in a solvent in the presence of a polymerization initiator, and then by reacting with a polyisocyanate (d).

The ingredients for the high-molecular-weight polymer $(D_1)$ are preferably used in such amounts that the monomer (c), having a vinyl group and an isocyanate group in the molecule, is 0.05 to 10% by weight, and the alkyl (metha) acrylate (b), whose alkyl group has 1 to 12 carbon atoms is 99.95 to 90% by weight.

The ingredients for the high-molecular-weight polymer $(D_2)$ are preferably used in such amounts that the monomer (h), having a vinyl group and active hydrogen in the molecule, is 0.05 to 10% by weight, the alkyl (metha) acrylate (b), whose alkyl group has 1 to 12 carbon atoms, is 99.85 to 70% by weight, and the polyisocyanate (d) is 0.1 to 20% by weight.

Next, ingredients used for polymerization of each of the graft copolymer (A) having at least one isocyanate group, low-molecular-weight polymer (E) having at least one isocyanate group, high-molecular-weight polymer (D) having at least one isocyanate group, and low-molecular-weight polymer (B) not having an isocyanate group, will be described hereinafter.

The monomer (c) may be selected from the group consisting of m-isopropenyl-α,α'-dimethyl benzyl isocyanate, p-isopropenyl-α,α'-dimethyl benzyl isocyanate, methacryloyl isocyanate, 2-methacryoyl oxymethyl isocyanate, 2-methacryoyl oxyethyl isocyanate, 2-methacryoyl oxypropyl isocyanate, acryloyl isocyanate, acryloyl oxymethyl isocyanate, acryloyl oxyethyl isocyanate, and acryloyl oxypropyl isocyanate.

The macromer (a) to be used in the present invention may be represented by the following general formula (I):

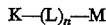     formula (I)

wherein L is a divalent organic group, K is a vinyl group copolymerizable with alkyl (metha)acrylate, M is a hydrocarbon group having a number-average molecular weight of 2,000 to 50,000 and a glass transition temperature of 20° C. or more, and n is 0 or 1.

More preferably the macromer (a) is a polymer-like monomer represented by the following general formula (II):

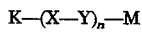     formula (II)

wherein K is as described above, X is an oxy group, a carbonyl group, an oxycarbonyl group, a methylene group, or a phenylene group, and Y is

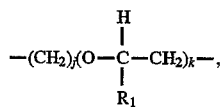,

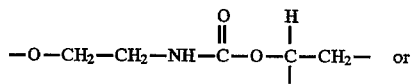 or

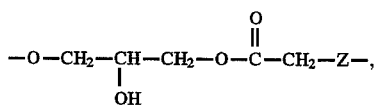, wherein $R_1$ and $R_2$ each are a hydrogen atom or an alkyl group having 1 to 5 carbon atoms, Z is thio group or

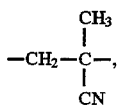, j is an integer of 0 to 2, and k is an integer of 0 to 3.)

Also, n is 0 or 1, and M is a hydrocarbon group having a number-average molecular weight of 2,000 to 50,000 and a glass transition temperature of 20° C. or more.

K in the above described general formula (II) of the macromer (a) has the following general formula (III):

wherein R is a hydrogen atom or $COOR_2$ ($R_2$ is a hydrogen atom or lower alkyl group), and $R_1$ is a hydrogen atom or methyl group.

K of the general formula (II) of the macromer (a) is preferably represented by the following general formula (IV):

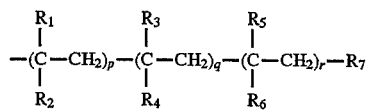     formula (IV)

wherein $R_1$, $R_2$, $R_3$, and $R_7$ each are a hydrogen atom or a lower alkyl group having 1 to 5 carbon atoms, $R_2$ is

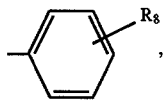, $R_4$ is —$COOR_9$, $R_6$ is —CN. $R_8$ is a hydrogen atom or a lower alkyl group, and $R_9$ is a lower alkyl group. Also, p+q+r is an integer of 20 to 500, and p, q, and r each are an integer of 0 to 500.

The macromer (a) is preferably selected from the following:

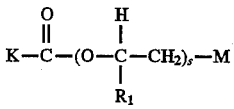

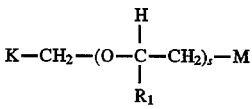

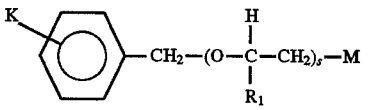

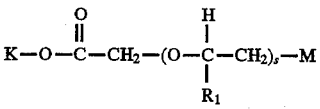

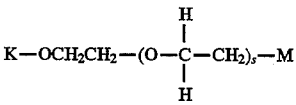

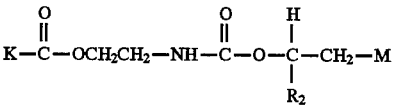

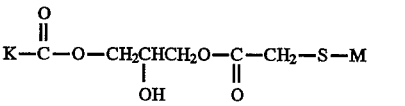

wherein $R_1$ and $R_2$ are a hydrogen atom or a lower alkyl group of 1 to 5 carbon atoms,.and s is an integer from 0 to 3.

Preferably macromer (a) is at least one selected from the group consisting of (metha)acryloyl-group-terminated polystyrene, (metha)acryloyl-group-terminated poly(t-butyl styrene), (metha)acryloyl-group-terminated poly (α-methyl styrene), (metha)acryloyl-group-terminated polyvinyl toluene, and (metha)acryloyl-group-terminated polymethyl methacrylate.

These macromers (a) are generally polystyrene, copolymer of styrene and acrylonitrile, poly(t-butyl styrene), poly (α-methyl styrene), polyvinyl toluene, and polymethyl methacrylate introduced vinyl group, such as methacryloyl group or acryloyl group at the terminal group, which are prepared by a living-anion-terminating method or chain transfer polymerization process and the like. The living-anion-terminating method comprises living-anionic-polymerizing a monomer, such as styrene, acrylonitrile, vinyl toluene, t-butyl styrene, α-methyl styrene, methyl methacrylate, or the like, and reacting the growth living anion with a terminating agent which has a double bond, to synthesize macromer, as disclosed by Milkovich et al. and as described in U.S. Pat. Nos. 3,786,116 and 3,842,059. The second method of terminating comprises introducing an alkylene oxide, such as ethylene oxide, in the living anion, to make alkoxide ion, further protonating, to obtain a hydroxy-terminated polymer. Then reacting a hydroxyl group with isocyanate alkyl acrylate or methacrylate having 1 to 4 carbon atoms in its alkyl group, to synthesize a macromer that has a vinyl group.

In the chain transfer polymerization process, radical polymerization is carried out using a polymerization initiator, such as 4,4'-azobis-4-cyano-valetic acid and the like, in the presence of a chain-transfer agent, such as thioglycolic acid and the like, to introduce a functional group in the terminal of the polymer, and reacting the functional group with, for example, glycidyl methacrylate and the like, to synthesize a macromer that has a vinyl group.

The macromer (a) has a glass transition temperature above 20° C. and a number-average molecular weight of more than 2,000. The glass transition temperature of the macromer (a) is preferably 40° C. to 200° C., more preferably 60° C. to 150° C. In the case of a glass transition temperature of below 20° C. or a number-average molecular weight of less than 2,000, the cohesive force before moisture-curing becomes insufficient. It is more preferable to have a number-average molecular weight of less than 50,000. When the number-average molecular weight is too large, the melting viscosity of the adhesive becomes too high, and the resulting coating properties become inadequate.

An example of a resin composition of this invention is one wherein the macromer (a) is a polystyrene-based macromer having a vinyl group at the terminal of the molecule and the graft copolymer is one having at least one isocyanate group and is prepared by copolymerizing 5 to 70 parts by weight of a polystyrene based macromer and 95 to 30 parts by weight of an alkyl (meth)acrylate (b) having a 1 to 12 carbon atom alkyl group and vinyl acetate.

Alkyl (metha)acrylate (b) whose alkyl group has 1 to 12 carbon atoms include one or more selected from methyl (metha)acrylate, ethyl (metha)acrylate, n-propyl (metha) acrylate, isopropyl (metha)acrylate, n-butyl (metha)acrylate, isobutyl (metha)acrylate, amyl (metha)acrylate, hexyl (metha)acrylate, heptyl (metha)acrylate, octyl (metha) acrylate, isooctyl (metha)acrylate, 2-ethyl hexyl (metha) acrylate, decyl (metha)acrylate, lauryl (metha)acrylate, benzyl (metha)acrylate, and pentyl (metha)acrylate.

The alkyl (metha)acrylate to be used for the graft copolymer of the present invention preferably has a alkyl group of 1 to 12 carbon atoms, and the average number of carbon atoms in the alkyl group is 4 to 12. Aforementioned definition that having 1 to 12 carbon atoms in the alkyl group, and 4 to 12 of average number of the carbon atoms refer to that the average number summed up the product of weight fraction of each alkyl (metha)acrylate to all the used alkyl (metha)acrylate by number of carbon atom of the alkyl group is 4 to 12.

The number of carbon atoms of the alkyl group of the alkyl (metha)acrylate to be used to the graft copolymer (A) is preferably 1 to 10, more preferably 1 to 8; the average number of carbon atoms of the alkyl group is preferably 4 to 10, more preferably 4 to 8, with n-butyl acrylate, 2-ethyl hexyl acrylate, isooctyl acrylate being especially preferred.

The number of carbon atoms of the alkyl group of the alkyl (metha)acrylate to be used to the low-molecular-weight polymer (E) and low-molecular-weight polymer (B) is also preferably 1 to 10, more preferably 1 to 8.

The monomer (h) is preferably at least one selected from the group consisting of monomers having a hydroxyl group, such as hydroxy ethyl (metha)acrylate, hydroxy propyl (metha)acrylate, and the like; unsaturated carboxylic acid, such as (metha)acrylic acid and the like; and monomers having an amide group, such as (metha)acrylamide and the like, with especially hydroxy (metha)acrylate being preferably used.

As the above-mentioned thermoplastic resin (f), a resin with substantially no active hydrogen reactive with an isocyanate group, such as hydroxyl group, carboxyl group, amino group, urethane bond, amide bond and urea bond, and the like, is used. Such resin may be one or more selected from the group consisting of a styrene-based block copolymer, such as styrene-isoprene-styrene block copolymeric resin, styrene-ethylene-butylene-styrene block copolymeric resin, styrene-ethylene-propylene-styrene block copolymeric resin, and the like; polyethylene, ethylene-vinyl acetate copolymeric resin, ethylene-ethyl acrylate copolymeric resin, ethylene-ethyl methacrylate copolymeric resin, styrene-alkyl (metha)acrylic ester graft copolymeric resin, styrene-alkyl (metha)acrylate-vinyl acetate graft copolymeric resin, ethylene-propylene copolymeric resin, butyl rubber, isoprene rubber, isobutylene rubber, acryl resin, ethylene-butene copolymeric resin, ethylene-propylene-diene copolymeric resin, polyester and polypropylene, polyurethane, polyamide, polyvinyl alcohol, saponified ethylene-vinyl acetate copolymeric resin, ethylene-acrylic acid copolymeric resin, and polyamine and the like which existing active hydrogen reacting with isocyanate group in large amount is not suitable since variation of melt viscosity when coating become great.

As the thermoplastic resin (f), preferably, styrene-based block copolymers are used, and of these can be mentioned one selected from the group consisting of, for example, X—Y—X block copolymer, X—Y copolymer, $(X-Y)_m$ star-type block copolymer and $X-(Y-X)_n-Y$ block copolymer (wherein, X is a polystyrene block or a poly α-methyl styrene block, Y is a polyolefin block, represented by a polybutadiene block, a polyisoprene block, a hydrogenated polybutadiene block, or a hydrogenated polyisoprene block; m is an integer from 3 to 10; and n is an integer from 2 to 50).

In the preparation of said graft copolymer (A) and said low-molecular-weight polymer (E), high-molecular-weight polymer (D), and low-molecular-weight polymer (B), as said polymerization initiator, the following initiators can be used: dicumyl peroxide, benzoyl peroxide, t-butyl peroxy-2-ethyl hexanoate and 1,1-bis(t-butyl peroxy) cyclohexane, α,α'-azo-diisobutylonitrile, acetyl peroxide, t-butyl peroxy pivalate, t-butyl hydroperoxide, cumene hydroperoxide, t-hexyl peroxy pivalate, 2,2'-azobis-(2,4-dimethyl valeronitrile), lauroyl peroxide, t-butyl peroxy neohexanoate, di-t-butyl peroxide, azodicyclohexyl carbonitrile, α,α-azodiiso dimethyl butyrate, succinic peroxide, dicumene peroxide, dichloro benzoyl peroxide, and the like.

As a solvent can be used ethyl acetate, butyl acetate, benzene, toluene, xylene, cyclohexane, methyl ethyl ketone, and the like.

When said graft copolymer (A), low-molecular-weight polymer (E), high-molecular-weight polymer (D), or low-molecular-weight polymer (B) is synthesized, another monomer which is copolymerizable with said constituting component can be used as a copolymerization component in a range not interfering with the feature of the present invention, preferably less than 30% by weight, such a monomer includes $\alpha,\beta$-unsaturated carboxylic acid, such as acrylic acid, methacrylic acid, crotonic acid, maleic acid, and fumaric acid, and anhydrides thereof; monomers having a hydroxyl group, such as hydroxyethyl (metha)acrylate, hydroxypropyl (metha)acrylate, and the like; monomers having a glycidyl group, such as glycidyl (metha)acrylate; unsaturated carboxylic amides having an amido group, such as (metha)acrylamide, N-methylol (metha)acrylamide, N-butoxy methyl (metha)acrylamide, diacetone (metha) acrylamide, and the like; monomers having an amino group, such as vinyl pyridine, dimethyl aminoethyl (metha)acrylate diethyl aminoethyl (metha)acrylate, and the like; and further monomers having a phosphoric acid group, such as acid phospho oxyethyl (metha)acrylate, acid phospho oxypropyl (metha)acrylate, and the like. Monomers such as vinyl acetate (except in the cases of low-molecular-weight polymer (E) and low-molecular-weight polymer (B)), (metha) acrylonitrile, and the like can also be copolymerized. Further, multi-functional acrylates, represented by triethylene glycol diacrylate and pentaerythritol triacrylate; multi-functional methacrylates, represented by ethylene glycol dimethacrylate, trimethylol propane trimethacrylate, divinyl benzene, and the like.

Polyisocyanate (d) includes tolylene diisocyanate, (hydrogenated) tolylene diisocyanate, diphenyl methane diisocyanate, (hydrogenated) diphenyl methane diisocyanate, hexamethylene diisocyanate, isophorone diisocyanate, naphthalene diisocyanate, polymethylene polyphenyl polyisocyanate, phenylene diisocyanate, xylilene diisocyanate, (hydrogenated) xylilene diisocyanate, methaxylilene diisocyanate, tetramethyl xylilene diisocyanate, and the like, and modifications thereof, with especially preferably tolylene diisocyanate, (hydrogenated) tolylene diisocyanate, diphenyl methane diisocyanate, (hydrogenated) diphenyl methane diisocyanate, hexamethylene diisocyanate, isophorone diisocyanate, naphthalene diisocyanate, polymethylene polyphenyl polyisocyanate, and modifications thereof, being used.

In the adhesive of the present invention, urethane prepolymer having 1.4 to 4.0 equivalent ratio of isocyanate group of polyisocyanate (d) to hydroxyl group of polyol (e), prepared by reacting said polyisocyanate (d) and polyol (e) is contained preferably in an amount less than 50% by weight.

If said urethane polymer exceeds 50% by weight, the initial cohesive force of the adhesives is insufficient; if the NCO/OH equivalent ratio is less than 1.4, the variation of melting viscosity at the time of coating is significant, if it is more than 4.0, environmental pollution problems accompanied with great generation of free isocyanate vapor at application time by existing large amount of free isocyanate component, or the problem of easy occurring of rapid reaction and occurring of over necessary foaming phenomena by moisture in the air is raised.

Polyisocyanate (d) to be used to prepare this urethane prepolymer includes above-mentioned material.

Said polyol (e) includes polyether polyol, polyester polyol, polycarbonate polyol, polybutylene polyol, polybutadiene polyol, polyisoprene polyol, hydrogenated polybutadiene polyol, hydrogenated polyisoprene polyol, castor oil, and derivatives thereof; and tall oil and derivatives thereof. Said polyether polyol is a polyoxypropylene polyol, polyoxyethylene polyol, or polyoxy-ethylene-propylene polyol random or block copolymer obtained by ring-opening polymerization of propylene oxide or/and ethylene oxide in the presence of one or more than two low-molecular-weight active hydrogen compounds having more than two active hydrogen, propylene oxide and/or ethylene oxide adduct of bisphenol A and/or bisphenol F, further, polyoxy tetramethylene glycol obtained by ring-opening polymerization of tetrahydrofuran and the like, which has 2 to 3 hydroxyl groups in a molecule.

The low-molecular-weight active hydrogen compound include glycols, such as ethylene glycol, propylene glycol, butylene glycol, 1,4-butane diol, 1,5-pentane diol, 1,6-hexane diol, neopentyl glycol, and the like; triols, such as glycerin, trimethylol propane, 1,2,6-hexane triol, and the like; and amines, such as ammonia, methyl amine, ethyl amine, propyl amine, butyl amine, and the like.

Said polyester polyol is ordinarily prepared by reaction of polybasic acid and polyhydric alcohol, or ring-opening reaction of $\epsilon$-caprolactone, $\beta$-methyl-$\delta$-valerolactone, and the like with polyhydric alcohol, which has a hydroxyl group in the terminal of the molecule.

The polybasic acid component includes terephthalic acid, isophthalic acid, phthalic anhydride, succinic acid, adipic acid, azelaic acid, sebacic acid, dodecanic acid, eicosanoic diacid, dimer acid, paraoxy benzoic acid, trimellitic anhydride, maleic acid, and the like.

Polyhydric alcohol includes said diols and triols, diethylene glycol, triethylene glycol, polyethylene glycol, dipropylene glycol, tripropylene glycol, polypropylene glycol, polytetramethylene glycol, 1,4-cyclohexane dimethanol, pentaerythritol, polybutadiene diol, hydrogenated polybutadiene glycol, 3-methyl-1,5-pentane diol, propylene oxide and/or ethylene oxide adduct of bisphenol A and/or bisphenol F, nonane diol, methyl octane diol, and the like, as well.

In the reactive hot-melt-type adhesive composition of the present invention comprising above mentioned each composition, preferably a tackifier resin in the range of less than 50% by weight for the purpose of improving the initial adhesive property may be used. In the case of more than 50% by weight of the trackifier resin the heat-resistant cohesive force after moisture curing is insufficient.

The tackifier resin of the present invention includes rosin and derivatives thereof, such as hydrogenated rosin, rosin glycerin ester, rosin pentaerythritol ester, polymerized rosin, hydrogenated polymerized rosin, (hydrogenated) rosin glycerin ester, (hydrogenated) rosin pentaerythritol ester, disproportionated rosin glycerin ester and disproportionated rosin pentaerythritol ester, terpene phenol resin, (hydrogenated) terpene phenol resin, ketone resin, petroleum resin (aliphatic based, aromatic based, copolymer based thereof and aliphatic cyclic based and the like), (hydrogenated) petroleum resin, terpene resin, (hydrogenated)terpene resin, cumarone-indene resin and xylene resin and the like, with especially preferably rosin and derivative thereof, terpene phenol resin, (hydrogenated) terpene phenol resin, petroleum resin, (hydrogenated) petroleum resin and keton resin being used.

Further in the reactive hot-melt-type adhesive composition of the present invention comprising above mentioned each composition, in the range of 0.01 to 5% by weight, more preferably a reaction curing accelerator, as described below is added for the purpose of more improving reactivity.

As the reaction-curing accelerator of present invention, single use or combination use of an organic tin compound and a tertiary amine is preferred. It has been found that in particular, employing of dibutyl tin dilaurate as the organic tin compound, and 1,3-dimethyl imidazolidinone as the tertiary amine, respectively, is especially preferred, since the effect of action and odorless property can be attained at the same time.

Further, the reactive hot-melt-type adhesive composition is preferably combined with less than 30% by weight of the below-described filler for purpose of further improving of coloring and heat stability of curing material, and adjusting of coefficient of thermal expansion and coefficient of shrinkage of the curing material, and relaxing residual stress occurring in adhered interface.

As such a filler, one or more dried fillers selected from zinc oxide powder, magnesium oxide powder, metal powder, silica powder (including colloidal silica), calcium carbonate powder, titanium oxide powder, talc powder, alumina powder, carbon black powder, and the like, is preferred. It is found that employing of especially zinc oxide powder, calcium carbonate powder, titanium oxide powder, talc powder, carbon black powder, and the like is preferred, since the weatherproof quality is greatly improved, and heat stability of the system becomes high. However, using more than 30% by weight of the filler results in exhibiting high thixotropy in viscosity of the system and lowering of operativity. Further the use of more than 30% by weight of filler is not preferred since there is harmful effect such as great acceleration of abrasion of hot-melt applicator.

In the reactive hot-melt-type adhesive composition of the present invention, there is also no objection to use the conventionally well known antioxidant, such as phosphite ester, hindered phenolic compound and the like, UV absorber such as benzotriazole and the like, organic thixo imparting agent, interface modifier such as silane or titanate based coupling agent, and the like.

In the reactive hot-melt-type adhesives of the present invention, a thermoplastic resin, a plasticizer and the like may be added in the range such as not to interfere with the inventive characteristic.

Said thermoplastic resin includes preferably ethylene-vinyl acetate copolymeric resin, ethylene-ethylacrylate, ethylene-methyl methacrylate copolymeric resin, styrene-butadiene-styrene block copolymeric resin, styrene-ethylene-butylene-styrene block copolymeric resin, styrene-ethylene-propytene-styrene block copolymeric resin, styrene-alkyl (metha)acrylate graft copolymeric resin, styrene-alkyl (metha)acrylate-vinyl acetate graft copolymeric resin, polyester, and the like.

The plasticizer includes representatively, for example, liquid polyisobutene, liquid polybutene, liquid (hydrogenated) polyisoprene, liquid (hydrogenated) polybutadiene, paraffinic oil, naphhtenic oil, epoxy type plasticizer, phosphoric esters, phthalic esters, aliphatic dibasic acid esters, and glycol esters.

The present resin composition is suitable as a reactive hot-melt adhesive, and since the present resin composition is sticky at normal temperatures and has a long pot life, the present resin composition can be applied in a production step where the time is long until an adherend is bonded after the adhesive has been applied thereto, or since the hot pressing step that is required for an adhesive that is not sticky at normal temperatures can be omitted, the present resin composition is very useful.

An example of a reactive hot-melt-type adhesive of this invention is one which comprises 10 to 90 parts by weight of polymer (A) and which is a polymer prepared by graft polymerizing monomer (c) having a vinyl group and an isocyanate group in the molecule onto thermoplastic resin (f) substantially free from an active hydrogen, or a polymer prepared by copolymerizing monomer (c), macromer (a) selected from a polystyrene macromer having a terminal vinyl group, and at least one monomer (g) selected from the group consisting of vinyl acetate and an alkyl (meth) acrylate having a 1 to 12 carbon atom alkyl group, and having 0.05 to 10% by weight isocyanate ratio, a number-average molecular weight of 8,000 to 200,000, and from 10 to less than 90 parts by weight of a low-molecular-weight polymer (E) prepared by copolymerizing monomer (c) and at least one monomer (g) selected from the group consisting of vinyl acetate and an alkyl (meth) acrylate having a 1 to 12 carbon atom alkyl group, or a polymer having a 500 to 7,000 number-average molecular weight and prepared by graft polymerizing monomer (c) to a (hydrogenated) petroleum resin or a (hydrogenated) terpene resin.

In addition, since the present resin composition is excellent in initial adhesion and heat resistance after curing, the present resin composition can be used effectively in the field of product assemblies, such as the fields of building materials and automobiles.

Further, since the present resin composition is excellent both in hot-melt coatability and cohesion of the pressure-sensitive adhesive, which characteristics are defective in conventional acrylic-type hot-melt pressure-sensitive adhesives, the present resin composition can be effectively used in the field of pressure-sensitive tapes, sheets, and labels.

The present resin composition is preferable because when it is used in the field of coating, the film physical properties, including weather resistance. and hot-melt coatability, are excellent.

EXAMPLES

Now the present invention will be described with reference to Examples, which do not limit the present invention at all. Evaluation of compositions prepared in Examples and Comparative Examples was carried out as given below. The percentages and parts used for compositions in the Examples represent percentages by weight and parts by weight, respectively.

(Conditions of Preparation of Samples for Measurement)

The above reactive hot-melt adhesive composition, melted to 120° C., was applied in a thickness of 200 μm on a steel plate (polyester-type service coat surface) having a thickness of 0.3 mm and a width of 1 inch, and immediately (Example 1 to 3, comparative example 1 to 2) or after one minute (Example 4 to 26, Comparative Example 3 to 12) bleached cloth was put thereon and was contact-bonded by pressing slightly with a rubber roll. After the composition was left standing for 30 min, until it reached room temperature, the initial adhesion strength (T-type peel strength) at 20° C. was measured. Also, after the applied composition was left standing for 1 week in a thermohygrostat at 20° C./60% RH, it was taken out and was used as samples for measurement of the T-type peel strength at 20° C. and 80° C.

(Conditions of Measurement of Adhesion Strength)

As the adhesion strength, the T-type peel strength was determined using a universal tensile strength tester (manufactured by INTESCO) at a crosshead speed of 10 mm/min at each measurement temperature.

(Change in Melting Viscosity)

The melting viscosity was measured at 120° C., 150° C. or 180° C. using a Brookfield rotational viscometer in the initial stage, 5 hours after, and 24 hours after respectively.

(Number-Average Molecular Weight of the Graft Copolymer and Low Molecular Weight Polymer)

The number-average molecular weight was measured using a gel permeation chromatograph (GPC) manufactured by Nihon Bunko Co, using a tetrahydrofuran solvent, and was expressed in terms of the number-average molecular weight of polystyrene.

(Glass Transition Temperature)

The glass transition temperature was measured by a differential scanning calorimeter (DSC) manufactured by Seiko Denshi Co.

(Tackiness at Normal Temperatures)

Tackiness to the touch at normal temperatures was tested and judgment was based on the following criteria:

◎: quite good (When it was peeled off, the resistance felt by the fingers was very strong.)

○: good (When it was peeled off, the resistance felt by the fingers was strong.)

△: somewhat poor (When it was peeled off, the resistance felt by the fingers was somewhat strong.)

X: poor (When it was peeled off, there was no resistance felt by the fingers.)

(Preparation of Pressure-Sensitive Adhesive Sheet)

After the reactive hot-melt adhesive composition was melted at 120° C. or 150° C., it was coated in the melted state in a thickness of 25 μm on polyethylene terephthalate film having a thickness of 25 μm, to obtain pressure-sensitive adhesive sheets.

This pressure-sensitive adhesive sheet was used to evaluate the performance of the adhesive by the methods given below.

(180° Peel Strength)

After a pressure-sensitive adhesive sheet was cured for 1 week at 20° C. and a relative humidity of 60%, the 180° peel strength of the pressure-sensitive adhesive sheet was measured using as an adherent a stainless steel in accordance with JIS Z 0237.

(Retention force against Shearing Resistance)

After a pressure-sensitive adhesive sheet was cured for 1 hour and for 1 week at 20° C. and a relative humidity of 60%, it was stuck to a stainless steel plate so that the adhesive area would be about 25 mm×25 mm, and, in accordance with JIS Z 0237, a load (weight) of 1 kg was hung to the pressure-sensitive adhesive sheet and the time required for the load to drop was measured in a thermostatic chamber at 20° C. and 40° C.

(Ball Tack)

An initial adhesive force was determined by a ball tack method.

After a pressure-sensitive adhesive sheet was cured for one week under 60% relative humidity, the adhesive force was determined in accordance with the J. Dow Method, at 30 degree of measuring angle and at temperature 20° C.

Example 1

50 parts of 2-ethylhexyl acrylate, 50 parts of Macromet AS-6 (having a molecular weight of 6,000; manufactured by Toagosei Chemical Industry Co., Ltd.), which is a polystyrene macromer, which serves as a macromer (a), 5 parts of 2-methacryloyloxyethyl isocyanate (manufactured by Showa Denko K. K.) as a monomer (c), and 0.2 part of benzoyl peroxide, as a polymerization initiator, were added into 40 parts of toluene, serving as a solvent, and polymerization was effected for 5 hours at a reaction temperature of 80° C., to prepare a graft copolymer $A_2$ solution. The number-average molecular weight of the graft copolymer was about 53,000. The isocyanate ratio was about 1.3.

Separately, 50 parts of n-butyl acrylate, 50 parts of methyl methacrylate, 20 parts of 2-methacryloyloxyethyl isocyanate (manufactured by Showa Denko K. K.) as a monomer (c), and 5 parts of benzoyl peroxide, as a polymerization initiator, were added into 100 parts of toluene, serving as a solvent, and the polymerization was effected for 5 hours at a reaction temperature of 100° C., to prepare a low-molecular-weight polymer $E_1$ solution. The number-average molecular weight of this low-molecular-weight polymer was about 5,000. 145 parts of the above graft copolymer solution and 225 parts of the above low-molecular-weight polymer solution were mixed, and the toluene was removed, to obtain the intended product. The adhesion strength of the thus prepared adhesive and the change in melting viscosity of the adhesive were measured. The results of the evaluation are shown in Table 1.

Example 2

40 parts of 2-ethylhexyl acrylate, 10 parts of methyl methacrylate, 50 parts of CHEMLINK 4545B (having a molecular weight of 4,500, manufactured by SARTOMER Co.), which is a polystyrene macromer, and which serves as a macromer (a), 1 part of m-isopropenyl-α,α'-dimethylbenzyl isocyanate (manufactured by ACC Co.), as a monomer (c), and 0.15 part of t-hexyl peroxypivalate, as a polymerization initiator, were added into 40 parts of xylene, serving as a solvent, and polymerization was effected for 5 hours at a reaction temperature of 80° C. to prepare a graft copolymer $A_2$ solution. The number-average molecular weight of the graft copolymer was about 78,000. At that time, the isocyanate ratio was about 0.2%. Separately, 50 parts of n-butyl acrylate, 50 parts of ethyl acrylate, 10 parts of m-isopropenyl-α,α'-dimethylbenzyl isocyanate (manufactured by ACC Co.), as a monomer (c), and 10 parts of benzoyl peroxide, as a polymerization initiator, were added into 100 parts of xylene, serving as a solvent, and polymerization was effected for 5 hours at a reaction temperature of 100° C., to prepare a low-molecular-weight polymer $E_1$ solution. The number-average molecular weight of this low-molecular-weight polymer was about 2,500. Further, 100 parts of Kurapol P-2010 (3-methyl-1,5-pentanediol adipate, having a molecular weight of 2,000; manufactured by Kuraray Co., Ltd.), which is a polyester polyol, and which serves as a polyol (j), and 25 parts of diphenylmethane diisocyanate (manufactured by Mitsui Toatsu Chemicals, Inc.), as a polyisocyanate (d), were reacted at 80° C. for 5 hours, to prepare a urethane prepolymer (B). At that time the NCO/OH equivalent ratio was 2.0. 70.5 parts of the above graft copolymer solution, 220 parts of the above low-molecular-weight polymer solution, and 125 parts of the above urethane prepolymer were melted and mixed, and the xylene was removed, to obtain the intended product. The adhesion strength of the thus prepared adhesive and the change in melting viscosity of the adhesive were measured. The results of the evaluation are shown in Table 1.

Example 3

50 parts of Kraton G-1657 (containing 29% of styrene and manufactured by Shell Chemical Co.), which is a styrene/ethylene/butylene/styrene block copolymer resin, and which serves as a thermoplastic resin (f), 50 parts of Escorez 5320 (manufactured by Tonex Co.), as a hydrogenated petroleum resin, 10 parts of m-isopropenyl-α,α'-dimethylbenzyl isocyanate (manufactured by ACC Co.), as a monomer (c), 0.05% of dibutyltin dilaurate, as a curing accelerator, and 0.2 part of dicumyl peroxide, as an organic peroxide, were melted in a kneader at 140° C., to obtain an adhesive. The thus prepared adhesive is a mixture of a graft copolymer $A_1$ and a low-molecular-weight polymer $E_2$; and the adhesion strength and the change in melting viscosity of the adhesive were measured. The results of its evaluation are shown in Table 1.

Comparative Example 1

100 parts of Nucrel 599 (having an acid content of 10% by weight; manufactured by Mitsui-du Pont Polychemical Co.), which is an ethylene/acrylic acid copolymer, and which serves as a thermoplastic resin (f), 10 parts of m-isopropenyl-α,α'-dimethylbenzyl isocyanate (manufactured by ACC Co.), as a monomer (c), 0.05% of dibutyltin dilaurate, as a curing accelerator, and 0.2 part of dicumyl peroxide, as an organic peroxide, were dryblended in a Henschel mixer and then were melted and extruded by an extruder at 120° C., to obtain an adhesive. The adhesion strength of the thus prepared adhesive and the change in melting viscosity of the adhesive were measured. The results of the evaluation are shown in Table 1.

Comparative Example 2

100 parts of poly(ethylene/1,4-butanediol adipate) (the molar ratio of the ethylene glycol/1,4-butanediol being about 1/1) having a number-average molecular weight of about 2,000, and serving as a polyester polyol, and 10 parts of tolylene diisocyanate (manufactured by Mitsui Toatsu Chemicals, Inc.), as a polyisocyanate, were reacted at 80° C. for 5 hours, to prepare a urethane prepolymer. The NCO/OH equivalent ratio was about 1.2. The adhesion strength of the thus prepared urethane prepolymer adhesive and the change in melting viscosity of the adhesive were measured. The results of the evaluation are shown in Table 1.

1,000 g of cyclohexane purified by distillation, 161 g of t-butylstyrene, and 10 ml of a solution of 1.0 mol of sec-butyllithium in 1 liter of cyclohexane, were placed in a flask and the polymerization was effected at 50° C. under a nitrogen atmosphere. After the polymerization, ethylene oxide gas was introduced to react substantially with the poly(t-butylstyryl)lithium. Thereafter, 3.0 g of acryloyl chloride was added, followed by cooling to room temperature, thereby preparing a polymer solution. This polymer solution was added dropwise to excess isopropyl alcohol, to precipitate the polymer. The precipitated polymer was filtered and dried in vacua, to obtain the intended product. The number-average molecular weight of this macromer was about 17,000.

(Preparation of Macromet 2)

A poly(α-methylstyrene) having an acrylate group at its terminal was prepared.

1,000 g of cyclohexane purified by distillation, 119 g of α-methylstyrene, and 10 ml of a solution of 1.0 mol of sec-butyllithium in 1 liter of cyclohexane, were placed in a flask and polymerization was effected at 50° C. under a nitrogen atmosphere. Thereafter, 3.0 g of acryloyl chloride was added, followed by cooling to room temperature, thereby preparing a polymer solution. This polymer solution was added dropwise to excess isopropyl alcohol, to precipitate the polymer.

The precipitated polymer was filtered and dried under a vacuum, to obtain the intended product. The number-average molecular weight of this macromer was about 13,000.

(Preparation of Macromer 3)

A poly(vinyltoluene) having a methacrylate group at its terminal was prepared.

1,000 g of cyclohexane purified by distillation, 119 g of vinyltoluene, and 5 ml of a solution of 1.0 mol of sec-butyllithium in 1 liter of cyclohexane were placed in a flask

TABLE 1

| | Example | | | Comparative Example | |
|---|---|---|---|---|---|
| | 1 | 2 | 3 | 1 | 2 |
| Graft copolymer | 105 | 50.5 | 55 | 110 | — |
| Low M.W. copolymer | 125 | 120 | 55 | Ethylene/acrylic acid copolymer | — |
| Urethane prepolymer | — | 125 | — | — | 100 |
| Tackifier resin | — | — | — | — | — |
| Change in melting viscosity (cp) | | | | | |
| Temperature (°C.) | 180 | 120 | 180 | 180 | 120 |
| Initial | 34,000 | 31,000 | 65,000 | 45,000 | 35,000 |
| After 5 hrs. | 37,000 | 36,000 | 70,000 | Gelation | 200,000 |
| After 24 hrs. | 50,000 | 46,000 | 90,000 | Gelation | Gelation |
| T-type peel strength (Kg/inch) | | | | | |
| Initial adhesion strength | 3.3 | 3.0 | 3.5 | Not measured because of gelation | Not measured because of gelation |
| At 20° C. after curing | 4.1 | 3.6 | 4.1 | Not measured because of gelation | Not measured because of gelation |
| At 80° C. after curing | 3.5 | 3.0 | 3.3 | Not measured because of gelation | Not measured because of gelation |

Reference Example (Preparation of Macromet 1)

A poly(t-butylstyrene) having an acrylate group at its terminal was prepared.

and polymerization was effected at 50° C. under a nitrogen atmosphere. After the polymerization, 2.0 g of acryloyl chloride was added, followed by cooling to room temperature, thereby preparing a polymer solution. This polymer solution was added dropwise to excess isopropyl alcohol, to precipitate the polymer. The precipitated polymer was filtered and dried in vacua, to obtain the intended product. The number-average molecular weight of this macromer was about 27,000.

(Preparation of Macromet 4)

A polymethyl methacrylate having a vinyl group at its terminal was prepared.

1,000 g of tetrahydrofuran purified by distillation, 108 g of methyl methacrylate, and 10 ml of a solution of 1.0 mol of sec-butyllithium in 1 liter of tetrahyddrofuran, were placed in a flask and polymerization was effected at 40° C. under a nitrogen atmosphere. After the polymerization, 2.5 g of allyl bromide was added, followed by cooling to room temperature, thereby preparing a polymer solution. This polymer solution was added dropwise to excess isopropyl alcohol, to precipitate the polymer. The precipitated polymer was filtered and dried in vacua, to obtain the intended product. The number-average molecular weight of this macromer was about 11,000.

(Preparation of Macromer 5)

A polystyrene having a methacrylate group at its terminal was prepared.

1,000 g of cyclohexane purified by distillation, 105 g of styrene, and 10 ml of a solution of 1.0 mol of sec-butyllithium in 1 liter of cyclohexane, were placed in a flask and polymerization was effected at 50° C. under a nitrogen atmosphere. After the polymerization, propylene oxide gas was introduced to react substantially with the polystyryl-lithium. Thereafter, 0.6 g of acetic acid was added to react, followed by quick cooling. Further, 4.7 g of 2-isocyanatoethyl methacrylate and 0.01 g of dibutyltin dilaurate were added, and the resulting mixture was heated to 60° C. to react for 5 hours, followed by cooling, thereby preparing a polymer solution. This polymer solution was added dropwise to excess isopropyl alcohol, to precipitate the polymer. The precipitated polymer was filtered and dried in vacua, to obtain the intended product. The number-average molecular weight of this macromer was about 12,000.

(Preparation of Macromer 6)

A polystyrene having a methacrylate group at its terminal was prepared by using the chain transfer method. 500 g of toluene, 500 g of styrene, and 20 g of thioglycolic acid were placed in a flask and were heated at a temperature of 80° C. under a nitrogen atmosphere. A solution of 15 g of 4,4'-azobis-4-cyanovaleric acid in 85 g of toluene was added into the flask drop by drop over 2 hours. The reaction mixture was further heated for one hour, to complete the polymerization. Then, 20 g of glycidyl methacrylate and 2 g of triethylamine were added and the reaction was allowed to continue at 80° C. for 5 hours, followed by cooling, thereby preparing a polymer solution. This polymer solution was added dropwise to excess isopropyl alcohol, to precipitate the polymer. The precipitated polymer was filtered and dried in vacua, to obtain the intended product. The number-average molecular weight of this macromer was about 12,000.

The glass transition temperatures of the macromers 1 to 6 were in the range of 80° C. to 150° C.

Example 4

70 parts of n-butyl acrylate, 30 parts of CHEMLINK 4500 (having a molecular weight of 13,000; manufactured by SARTOMER Co.), as a macromer (a), 20 parts of 2-methacryloyloxyethyl isocyanate (manufactured by Showa Denko K. K.), as a monomer (c), and 0.4 part of α,α-azobisisobutyronitrile, as a polymerization initiator, were added into 50 parts of ethyl acetate, serving as a solvent, and polymerization was effected at a reaction temperature of 70° C. for 5 hours, thereby preparing a graft copolymer $A_2$ solution. The number-average molecular weight of this graft copolymer was about 22,000, and the glass transition temperature of the alkyl (metha)acrylate portion was about −50° C. The isocyanate ratio was about 4.5%. Separately, 50 parts of n-butyl acrylate, 50 parts of methyl methacrylate, 20 parts of 2-methacryloyloxyethyl isocyanate (manufactured by Showa Denko K. K.), as a monomer (c), and 5 parts of benzoyl peroxide, as a polymerization initiator, were added into 100 parts of ethyl acetate, serving as a solvent, and polymerization was effected at a reaction temperature of 100° C. for 5 hours, thereby preparing a low-molecular-weight polymer $E_1$ solution. The number-average molecular weight of this low-molecular-weight polymer was about 5,000, and the glass transition temperature was about 0° C. The isocyanate ratio was about 4.5%. The above graft copolymer solution and the above low-molecular-weight polymer solution were mixed, so that the weight ratio of the graft copolymer/low-molecular-weight polymer would be about 50/50, and the ethyl acetate was removed, to obtain the intended product. The adhesion strength of the thus prepared adhesive and the change in melting viscosity of the adhesive were measured. The results of the evaluation are shown in Table 2.

Example 5

50 parts of 2-ethylhexyl acrylate, 10 parts of methyl methacrylate, 40 parts of Macromer AS-6 (having a molecular weight of 6,000; manufactured by Toagosei Chemical Industry Co., Ltd.), as a macromer (a), 5 parts of m-isopropenyl-α,α'-dimethylbenzyl isocyanate (manufactured by ACC Co.), as a monomer (c), and 0.15 part of t-hexyl peroxypivalate, as a polymerization initiator, were added into 40 parts of toluene, serving as a solvent, and polymerization was effected for 5 hours at a reaction temperature of 80° C., to prepare a graft copolymer $A_2$ solution. The number-average molecular weight of the graft copolymer was about 78,000, and the glass transition temperature was about −44° C. At that time the isocyanate ratio was about 1.0%. Separately, 20 parts of isobutyl acrylate, 80 parts of ethyl methacrylate, 10 parts of m-isopropenyl-α,α'-dimethylbenzyl isocyanate (manufactured by ACC Co.), as a monomer (c), and 10 parts of benzoyl peroxide, as a polymerization initiator, were added into 100 parts of toluene, serving as a solvent, and polymerization was effected for 5 hours at a reaction temperature of 100° C., to prepare a low-molecular-weight polymer $E_1$ solution. The number-average molecular weight of this low-molecular-weight polymer was about 2,500, and the glass transition temperature was about 40° C. At that time the isocyanate ratio was about 2.0%. The above graft copolymer solution and the above low-molecular-weight polymer solution were mixed, so that the weight ratio of the graft copolymer/low-molecular-weight polymer would be about 30/70; then 0.5% of dibutyltin dilaurate, as a reaction accelerator, was added, and the toluene was removed, to obtain the intended product. The adhesion strength of the thus prepared adhesive and the change in melting viscosity of the adhesive were measured. The results of the evaluation are shown in Table 2.

Example 6

An adhesive was prepared in the same manner as in Example 4, except that, instead of the 2-methacryloyloxyethyl isocyanate, hydroxyethyl acrylate was used as a monomer (h), and as a polyisocyanate (d), diphenylmethane diisocyanate (MDI-PH, manufactured by Mitsui Toatsu Chemicals, Inc.) was reacted, so that the NCO/OH equivalent ratio would be about 2.0. This adhesive is a mixture of a graft copolymer ($A_3$) and a low-molecular-weight polymer ($E_3$). The adhesion strength of the thus prepared adhesive and the change in melting viscosity of the adhesive were measured. The results of the evaluation are shown in Table 2.

Example 7

An adhesive was prepared in the same manner as in Example 5, except that, instead of the m-isopropenyl-α,α'-dimethylbenzyl isocyanate, acrylic acid was used as a monomer (h) and as a polyisocyanate (d), a polymethylenepolyphenyl polyisocynate (MDI-CRUDE 200, manufactured by Mitsui Toatsu Chemicals, Inc.) was reacted, so that the NCO/OH equivalent ratio would be about 2.0. The results of the evaluation are shown in Table 2.

Example 8

100 Parts of Kurapol P-2010 (3-methyl-1,5-pentanediol adipate having a molecular weight of 2,000; manufactured by Kuraray Co., Ltd.), which is a polyester polyol, and which serves as a polyol (j), and 25 parts of diphenylmethane diisocyanate (manufactured by Mitsui Toatsu Chemicals, Inc.), as a polyisocyanate (d), were reacted at 80° C. for 5 hours, to prepare a urethane prepolymer (B). At that time the NCO/OH equivalent ratio was 2.0. 100 parts of the adhesive obtained in Example 4 and 20 parts of the above urethane prepolymer were melted and mixed, to obtain the intended product. The results of the evaluation are shown in Table 2.

Example 9

100 parts of the adhesive prepared in Example 5 and 25 parts of Super Ester A-100 (disproportional rosin glycerin ester, manufactured by Arakawa Chemical Industry Co.) as a tackifier resin were melted and mixed, to obtain the intended product. The results of the evaluation are shown in Table 2.

Example 10

An adhesive was prepared in the same manner as in Example 5, except that, instead of the dibutyltin dilaurate, 1,3-dimethylimidazolidinone was used. To the adhesive was added 10% of dry calcium carbonate powder, as a filler, to obtain the intended product. The results of the evaluation are shown in Table 2.

Example 11

An adhesive was prepared in the same manner as in Example 5, except that, instead of the Macromer AS-6, as a macromer (a), AN-6 (having a molecular weight of 6,000, and manufactured by Toagosei Chemical Industry Co., Ltd.), as a poly(styrene/acrylonitrile) macromer was used. The results of the evaluation are shown in Table 2.

Example 12

An adhesive was prepared in the same manner as in Example 4, except that, instead of the polystyrene having a methacryloyl group at its terminal, available under the trade name of CHEMLINK 4500, as a macromer (a), the macromer 5 was used. The results of the evaluation are shown in Table 2.

Example 13

An adhesive was prepared in the same manner as in Example 4, except that, instead of the polystyrene having a methacryloyl group at its terminal, available under the trade name of CHEMLINK 4500, as a macromer (a), the macromer 6 was used. The results of the evaluation are shown in Table 2.

Comparative Example 3

An adhesive was prepared in the same manner as in Example 4, except that, instead of the n-butyl acrylate in the graft copolymer, methyl methacrylate was used. The results of the evaluation are shown in Table 2.

Comparative Example 4

An adhesive was prepared in the same manner as in Example 4, except that, instead of the methyl methacrylate in the low-molecular-weight polymer, n-butyl acrylate was used. The results of the evaluation are shown in Table 2.

Comparative Example 5

An adhesive was prepared in the same manner as in Example 5, except that the macromer (a) was not used. The results of the evaluation are shown in Table 2.

TABLE 2

| | Example | | | | | | | | | | Comparative Example | | |
|---|---|---|---|---|---|---|---|---|---|---|---|---|---|
| | 4 | 5 | 6 | 7 | 8 | 9 | 10 | 11 | 12 | 13 | 3 | 4 | 5 |
| Graft copolymer | 50 | 30 | 50 | 30 | 50 | 30 | 27 | 30 | 50 | 50 | *¹50 | 50 | *³30 |
| Low M.W. copolymer | 50 | 70 | 50 | 70 | 50 | 70 | 63 | 70 | 50 | 50 | 50 | *²50 | 70 |
| Urethane prepolymer | — | — | — | — | 20 | — | — | — | — | — | — | — | — |
| Tackifier resin | — | — | — | — | — | 25 | — | — | — | — | — | — | — |
| Filler | — | — | — | — | — | — | 10 | — | — | — | — | — | — |
| Change in melting viscosity (cp) | | | | | | | | | | | | | |
| Temperature (°C.) | 120 | 120 | 120 | 120 | 120 | 120 | 120 | 120 | 120 | 120 | 120 | 120 | 120 |
| Initial | 35,000 | 22,000 | 38,000 | 30,000 | 21,000 | 15,000 | 30,000 | 22,000 | 33,000 | 36,000 | 66,000 | 17,000 | 12,000 |
| After 24 hrs. | 38,000 | 26,000 | 41,000 | 36,000 | 26,000 | 21,000 | 37,000 | 27,000 | 38,000 | 41,000 | 75,000 | 20,000 | 15,000 |
| Tackiness at normal temperature | ⊚ | ⊚ | ◯ | ◯ | ◯ | ⊚ | ⊚ | ⊚ | ⊚ | ⊚ | X | ⊚ | ⊚ |

TABLE 2-continued

| | Example | | | | | | | | | | Comparative Example | | |
|---|---|---|---|---|---|---|---|---|---|---|---|---|---|
| | 4 | 5 | 6 | 7 | 8 | 9 | 10 | 11 | 12 | 13 | 3 | 4 | 5 |
| T-type peel strength (Kg/inch) | | | | | | | | | | | | | |
| Initial strength | 3.1 | 3.2 | 3.3 | 2.8 | 3.0 | 3.3 | 3.1 | 3.2 | 3.0 | 2.8 | 0.0 | 0.3 | 0.2 |
| At 20° C. after curing | 3.8 | 4.3 | 4.1 | 3.8 | 3.6 | 4.1 | 4.0 | 4.2 | 3.8 | 3.7 | 0.0 | 2.8 | 3.0 |
| At 80° C. after curing | 3.4 | 3.8 | 3.5 | 3.1 | 3.2 | 3.0 | 3.6 | 3.8 | 3.3 | 3.1 | 0.0 | 2.1 | 2.7 |

Note:
*[1]Metyl acrylate was used.
*[2]n-Butyl acrylate was used.
*[3]Macromer was not used.

Example 14

20 parts of Kraton G-1657 (SEBS, manufactured by Shell Chemical Co.), which is a styrene-based block copolymer resin, as a thermoplastic resin (f), was dissolved in 50 parts of ethyl acetate, then 70 parts of n-butyl acrylate, 10 parts of 2-methacryloyloxyethyl isocyanate (manufactured by Showa Denko K. K.), as a monomer (c), and 0.4 part of α,α-azoisobutyronitrile, as a polymerization initiator, were added thereto, and the polymerization was effected at a reaction temperature of 70° C. for 5 hours, to prepare a graft copolymer $A_4$ solution. The number-average molecular weight of this graft copolymer was about 23,000 and the glass transition temperature of the alkyl (metha)acrylate portion was about −50° C. The isocyanate group content was about 2.7%. Separately, 50 parts of n-butyl acrylate, 50 parts of methyl methacrylate, 20 parts of 2-methacryloyloxyethyl isocyanate (manufactured by Showa Denko K. K.), as a monomer (c), and 5 parts of benzoyl peroxide, as a polymerization initiator, were added into 100 parts of ethyl acetate, serving as a solvent, and polymerization was effected at a reaction temperature of 100° C. for 5 hours, to prepare a low-molecular-weight polymer $E_1$ solution. The number-average molecular weight of this low-molecular-weight polymer was about 5,000 and the glass transition temperature was about 0° C. The isocyanate group content was about 4.5%. The above graft copolymer solution and the above low-molecular-weight polymer solution were mixed, so that the weight ratio of the graft copolymer/low-molecular-weight polymer would be about 50/50, and the ethyl acetate was removed, to obtain the intended product. The adhesion strength of the thus prepared adhesive and the change in melting viscosity of the adhesive were measured. The results of the evaluation are shown in Table 3.

Example 15

30 parts of Califlex TR-1107 (SIS, manufactured by Shell Chemical Co.), which is a styrene-based block copolymer resin, and which serves as a thermoplastic resin (f), was dissolved in 40 parts of toluene, then 55 parts of 2-ethylhexyl acrylate, 10 parts of methyl methacrylate, 5 parts of m-isopropenyl-α,α'-dimethylbenzyl isocyanate (manufactured by ACC Co.), as a monomer (c), and 0.15 part of t-hexyl peroxypivalate, as a polymerization initiator, were added thereto, and polymerization was effected at a reaction temperature of 80° C. for 5 hours, to prepare a graft copolymer $A_4$ solution. The number-average molecular weight of this graft copolymer was about 58,000 and the glass transition temperature was about −45° C. At that time, the isocyanate group content was about 1.0%. Separately, 20 parts of isobutyl acrylate, 80 parts of ethyl methacrylate, 10 parts of m-isopropenyl-α,α'-dimethylbenzyl isocyanate (manufactured by ACC Co.), as a monomer (c), and 10 parts of benzoyl peroxide, as a polymerization initiator, were added into 100 parts of toluene, serving as a solvent, and polymerization was effected at a reaction temperature of 100° C. for 5 hours, to prepare a low-molecular-weight polymer $E_1$ solution. The number-average molecular weight of this low-molecular-weight polymer was about 2,500 and the glass transition temperature was about 40° C. At that time the isocyanate group content was about 2.0%. The above graft copolymer solution and the above low-molecular-weight polymer solution were mixed, so that the weight ratio of the graft copolymer/low-molecular-weight polymer would be about 30/70, then 0.5% of dibutyltin dilaurate as a reaction accelerator was added, and the toluene was removed, to obtain the intended product. The adhesion strength of the thus prepared adhesive and the change in melting viscosity of the adhesive were measured. The results of the evaluation are shown in Table 3.

Example 16

An adhesive was prepared in the same manner as in Example 14, except that, instead of 2-methacryloyloxyethyl isocyanate, hydroxyethyl acrylate was used as a monomer (h), and as a polyisocyanate (d), diphenylmethane diisocyanate (MDI-PH, manufactured by Mitsui Toatsu Chemicals, Inc.) was reacted, so that the NCO/OH equivalent ratio would be about 2.0. This adhesive is a mixture of the graft copolymer $A_5$ and the low-molecular-weight polymer $E_3$. The results of the evaluation are shown in Table 3.

Example 17

An adhesive was prepared in the same manner as in Example 15, except that, instead of m-isopropenyl-α,α'-dimethylbenzyl isocyanate, acrylic acid was used as a monomer (h), and as a polyisocyanate (d), polymethylenepolyphenyl polyisocyanate (MDI-CRUDE 200, manufactured by Mitsui Toatsu Chemicals, Inc.) as a polyisocyanate (d) was reacted, so that the NCO/COOH equivalent ratio would be about 2.0. This adhesive is a mixture of the graft copolymer ($A_5$) and the low-molecular-weight polymer ($E_3$). The results of the evaluation are shown in Table 3.

Example 18

100 parts of Kurapol P-2010 (3-methyl-1,5-pentanediol adipate, having a molecular weight of 2,000; manufactured by Kuraray Co., Ltd.), which is a polyester polyol and which serves as a polyol (j) and 25 parts of diphenylmethane diisocyanate (manufactured by Mitsui Toatsu Chemicals, Inc.), as a polyisocyanate (d), were reacted at 80° C. for 5 hours, to prepare a urethane prepolymer (B). At that time, the NCO/OH equivalent ratio was 2.0. 20 parts of the above urethane prepolymer and 100 parts of the adhesive prepared in Example 14 were melted and mixed, to obtain the intended product. The results of the evaluation are shown in Table 3.

Example 19

100 parts of the adhesive prepared in Example 15 and 25 parts of Super Ester A-100 (disproportional rosin glycerin ester, manufactured by Arakawa Chemical Industry Co.), as a tackifier resin, were melted and mixed, to obtain the intended product. The results of the evaluation are shown in Table 3.

Example 20

An adhesive was prepared in the same manner as in Example 15, except that, instead of the dibutyltin dilaurate, 1,3-dimethylimidazolidinone was used. To the adhesive was added 10% of dry calcium carbonate powder, as a filler, to obtain the intended product. The results of the evaluation are shown in Table 3.

Comparative Example 6

An intended adhesive was prepared in the same manner as in Example 14, except that, instead of n-butyl acrylate in the graft copolymer having isocyanate groups, methyl methacrylate was used. The results of the evaluation are shown in Table 3.

Comparative Example 7

An intended adhesive was prepared in the same manner as in Example 14, except that, instead of methyl methacrylate in the low-molecular-weight polymer having isocyanate groups, n-butyl acrylate was used. The results of the evaluation are shown in Table 3.

Comparative Example 8

55 parts of 2-ethylhexyl acrylate, 10 parts of methyl methacrylate, 5 parts of m-isopropenyl-α,α'-dimethylbenzyl isocyanate (manufactured by ACC Co.), as a monomer (c), and 0.15 part of t-hexyl peroxypivalate, as a polymerization initiator, were added into 40 parts of toluene, and polymerization was effected for 5 hours at a reaction temperature of 80° C., to prepare a high-molecular-weight copolymer solution. The number-average molecular weight of the high-molecular-weight copolymer was about 48,000 and the glass transition temperature was −45° C. Separately, 20 parts of isobutyl acrylate, 80 parts of ethyl methacrylate, 10 parts of m-isopropenyl-α,α'-dimethylbenzyl isocyanate (manufactured by ACC Co.), as a monomer (c), and 10 parts of benzoyl peroxide, as a polymerization initiator, were added into 100 parts of toluene serving as a solvent, and polymerization was effected for 5 hours at a reaction temperature of 100° C., to prepare a low-molecular-weight polymer solution. The number-average molecular weight of this low-molecular-weight polymer was about 2,500 and the glass transition temperature was about 40° C. At that time, the isocyanate group content was about 2.0%. The above high-molecular-weight copolymer solution, the above low-molecular-weight polymer solution, and Califlex TR-1107 (SIS, manufactured by Shell Chemical Co.), which is a styrene-type block copolymer, and which serves as a thermoplastic resin (f), were mixed, so that the weight ratio of the styrene-type block copolymer/high-molecular-weight copolymer/low-molecular-weight polymer would be about 9/21/70, then 0.5% of dibutyltin dilaurate, as a reaction accelerator, was further added, and the toluene was removed, to obtain the intended product. The adhesion strength of the thus prepared adhesive and the change in melting viscosity of the adhesive were measured. The results of the evaluation are shown in Table 3.

TABLE 3

|  | Example | | | | | | | Comparative Example | | |
| --- | --- | --- | --- | --- | --- | --- | --- | --- | --- | --- |
|  | 14 | 15 | 16 | 17 | 18 | 19 | 20 | 6 | 7 | 8 |
| Graft copolymer | 50 | 30 | 50 | 30 | 50 | 30 | 27 | *¹50 | 50 | *³ |
| Low M.W. copolymer | 50 | 70 | 50 | 70 | 50 | 70 | 63 | 50 | *²50 | |
| Urethane prepolymer | — | — | — | — | 20 | — | — | — | — | — |
| Tackifier resin | — | — | — | — | — | 25 | — | — | — | — |
| Filler | — | — | — | — | — | — | 10 | — | — | — |
| Change in melting viscosity (cp) | | | | | | | | | | |
| Temperature (°C.) | 120 | 120 | 120 | 120 | 120 | 120 | 120 | 120 | 120 | 120 |
| Initial | 36,000 | 20,000 | 40,000 | 31,000 | 22,0oo0 | 14,000 | 31,000 | 68,000 | 15,000 | 11,000 |
| After 24 hrs. | 52,000 | 28,000 | 55,000 | 45,000 | 38,000 | 24,000 | 41,000 | 83,000 | 25,000 | 18,000 |
| Tackiness at normal temperature | ⊙ | ⊙ | ○ | ○ | ○ | ⊙ | ⊙ | X | ⊙ | ⊙ |
| T-type peel strength (Kg/inch) | | | | | | | | | | |
| Initial strength | 3.0 | 3.2 | 3.3 | 2.6 | 2.8 | 3.5 | 3.3 | 0.0 | 0.3 | 0.2 |
| At 20° C. after curing | 3.8 | 4.2 | 4.2 | 3.9 | 3.7 | 4.1 | 4.1 | 0.0 | 2.8 | 3.1 |
| At 80° C. after curing | 3.2 | 3.6 | 3.4 | 3.0 | 3.1 | 2.9 | 3.6 | 0.0 | 2.0 | 2.4 |

Note:
*¹Metyl methacrylate was used.
*²n-Butyl acrylate was used.
*³Macromer was not used. Styrene-based block copolymer was blended after polymerization.

Example 21

An adhesive was prepared in the same manner as in Example 5, except that, instead of polystyrene having a methacryloyl group at its terminal, available under the trade name of CHEMLINK 4500, as macromer (a), the macromer 1 was used. The results of the evaluation are shown in Table 4.

Example 22

An adhesive was prepared in the same manner as in Example 5, except that, instead of polystyrene having a methacryloyl group at its terminal, available under the trade name of CHEMLINK 4500, as a macromer (a), the macromer 2 was used. The results of the evaluation are shown in Table 4.

Example 23

95 parts of Evaflex 40 (containing 40% of vinyl acetate; manufactured by Mitsui-du Pont Polychemical Co.), which is an ethylene/vinyl acetate copolymer resin, and which serves as a thermoplastic resin (f), 5 parts of m-isopropenyl-$\alpha,\alpha'$-dimethylbenzyl isocyanate (manufactured by ACC Co.), as a monomer (c), and 0.15 part of dicumyl peroxide, as an organic peroxide, were melted in a kneader at 140° C., and reaction was effected for 2 hours, to prepare a graft copolymer $A_1$ solution. The number-average molecular weight of this graft copolymer was about 38,000. Separately, 20 parts of isobutyl acrylate, 80 parts of ethyl methacrylate, 10 parts of m-isopropenyl-$\alpha,\alpha'$-dimethylbenzyl isocyanate (manufactured by ACC Co.), as a monomer (c), and 10 parts of benzoyl peroxide, as a polymerization initiator, were added into 100 parts of toluene, serving as a solvent, and polymerization was effected at a reaction temperature of 100° C. for 5 hours, to prepare a low-molecular-weight polymer ($E_1$) solution. The number-average molecular weight of this low-molecular-weight polymer was about 2,500 and the glass transition temperature was about 40° C. At that time the isocyanate group content was about 2.0%. The above graft copolymer solution and the above low-molecular-weight polymer solution were mixed, so that the weight ratio of the graft copolymer/low-molecular-weight polymer would be about 40/60, then 0.5% of dibutyltin dilaurate, as a reaction accelerator, was added, and the toluene was removed, to obtain the intended product. The adhesion strength of the thus prepared adhesive and the change in melting viscosity of the adhesive were measured. The results of the evaluation are shown in Table 4.

Example 24

A graft copolymer $A_2$ was obtained in the same manner as in Example 5. Separately, a low-molecular-weight polymer $E_2$ was obtained by melting at 140° C. 90 parts of YS resin TO-105 (manufactured by Yasuhara Chemical Co.), as a terpene resin, 10 parts of m-isopropenyl-$\alpha,\alpha'$-dimethylbenzyl isocyanate (manufactured by ACC Co.), as a monomer (c), and 0.3 part of dicumyl peroxide, as an organic peroxide, and reacting them for 2 hours, in a kneader. The graft copolymer and the low-molecular-weight polymer were mixed, so that the weight ratio of the graft copolymer/low-molecular-weight polymer would be about 70/30, and 0.5% of dibutyltin dilaurate, as a reaction accelerator, was added, to obtain the intended product. The adhesion strength of the thus prepared adhesive and the change in melting viscosity of the adhesive were measured. The results of the evaluation are shown in Table 4.

Example 25

An adhesive was prepared in the same manner as in Example 4, except that, instead of the 2-methacryloyloxyethyl isocyanate of the low-molecular-weight polymer, hydroxyethyl acrylate was used as a monomer (h), and as a polyisocyanate (d), diphenylmethane diisocyanate (MDI-PH, manufactured by Mitsui Toatsu Chemicals, Inc.), was reacted, so that the NCO/OH equivalent ratio would be about 2.0. This adhesive is a mixture of the graft copolymer $A_2$ and the low-molecular-weight polymer $E_3$. The results of the evaluation are shown in Table 4.

Example 26

An adhesive was prepared in the same manner as in Example 4, except that, instead of the 2-methacryloyloxyethyl isocyanate of the graft polymer, hydroxyethyl acrylate was used as a monomer (h), and as a polyisocyanate (d), diphenylmethane diisocyanate (MDI-PH, manufactured by Mitsui Toatsu Chemicals, Inc.), was reacted, so that the NCO/OH equivalent ratio would be about 2.0. This adhesive is a mixture of the graft copolymer $A_3$ and the low-molecular-weight polymer $E_1$. The results of the evaluation are shown in Table 4.

Comparative Example 9

An adhesive was prepared in the same manner as in Example 4, except that the low-molecular-weight polymer was not used. The results of the evaluation are shown in Table 4.

Comparative Example 10

15 parts of CHEMLINK 4500 (having a molecular weight of 13,000 and manufactured by SARTOMER Co.), as a macromer (a), 75 parts of n-butyl acrylate, 10 parts of 2-methacryloyloxyethyl isocyanate (manufactured by Showa Denko K. K.), as a monomer (c), and 1.0 part of $\alpha,\alpha$-azo-bisisobutyronitrile, as a polymerization initiator, were added into 50 parts of ethyl acetate serving as a solvent, polymerization was effected at a reaction temperature of 70° C. for 5 hours, thereby preparing a graft copolymer solution, and the ethyl acetate was then removed to, obtain the intended product. The number-average molecular weight of this graft copolymer was about 15,000 and the glass transition temperature of the alkyl (metha)acrylate portion was about $-45°$ C. The isocyanate ratio was about 2.7%. The adhesion strength of the thus prepared adhesive and the change in melting viscosity of the adhesive were measured. The results of the evaluation are shown in Table 4.

Comparative Example 11

70 parts of n-butyl acrylate, 30 parts of CHEMLINK 4500 (having a molecular weight of 13,000; manufactured by SARTOMER Co.), as a macromer (a), 30 parts of 2-methacryloyloxyethyl isocyanate (manufactured by Showa Denko K. K.), as a monomer (c), and 0.4 part of $\alpha,\alpha$-azobisisobutyronitrile, as a polymerization initiator, were added into 50 parts of ethyl acetate serving as a solvent, polymerization was effected at a reaction temperature of 70° C. for 5 hours, thereby preparing a graft copolymer solution, and the ethyl acetate was then removed, to obtain the intended product. The number-average molecular weight of this graft copolymer was about 22,000. The isocyanate ratio was about 6.2%. The adhesion strength of the thus prepared adhesive and the change in melting viscosity of the adhesive were measured. The results of the evaluation are shown in Table 4.

Comparative Example 12

15 parts of Septon 2043 (SEPS, manufactured by Kuraray Co., Ltd.), which is a styrene-based block copolymer resin, and which serves as a thermoplastic resin (f) was dissolved in 50 parts of toluene, then 75 parts of n-butyl acrylate, 10 parts of 2-methacryloyloxyethyl isocyanate (manufactured by Showa Denko K.K.), as a monomer (c), and 1.0 part of benzoyl peroxide, as a polymerization initiator, were added thereto, polymerization was effected at a reaction temperature of 70° C. for 5 hours, to prepare a graft copolymer solution, and the toluene was then removed, to obtain the intended adhesive. The number-average molecular weight of this graft copolymer was about 18,000 and the glass transition temperature of the alkyl (metha)acrylate portion was about −50° C. At that time, the isocyanate group content was about 2.7%. The adhesion strength of the thus prepared adhesive and the change in melting viscosity of the adhesive were measured. The results of the evaluation are shown in Table 4.

above graft copolymer solution and the above low-molecular-weight polymer solution were mixed, so that the weight ratio of the graft copolymer/low-molecular-weight polymer would be about 80/20, then 0.5% of dibutyltin dilaurate, as a reaction accelerator, was added, and the toluene was removed, to obtain the intended product. The adhesion strength of the thus prepared pressure-sensitive adhesive and the change in melting viscosity of the pressure-sensitive adhesive were measured. The results of the evaluation are shown in Table 5.

Example 28

An adhesive was prepared in the same manner as in Example 27, except that, instead of m-isopropenyl-$\alpha,\alpha'$-dimethylbenzyl isocyanate of the low-molecular-weight polymer, hydroxyethyl acrylate was used as a monomer (h),

TABLE 4

| | Example | | | | | | Comparative Example | | | |
|---|---|---|---|---|---|---|---|---|---|---|
| | 21 | 22 | 23 | 24 | 25 | 26 | 9 | 10 | 11 | 12 |
| Graft copolymer | 30 | 30 | 40 | 70 | 50 | 50 | 100 | 100 | 100 | 100 |
| Low M.W. copolymer | 70 | 70 | 60 | 30 | 50 | 50 | None | None | None | None |
| Change in melting viscosity (cp) | | | | | | | | | | |
| Temperature (°C.) | 120 | 120 | 120 | 120 | 120 | 120 | 150 | 150 | 180 | 150 |
| Initial | 37,000 | 31,000 | 75,000 | 32,000 | 38,000 | 44,000 | 68,000 | 32,000 | 82,000 | 31,000 |
| After 24 hrs. | 50,000 | 41,000 | 98,000 | 51,000 | 52,000 | 64,000 | 500,000< | 500,000< | Gelation | 500,000< |
| Tackiness at normal temperature | ◯ | ◯ | ⊙ | ◯ | ⊙ | ⊙ | ⊙ | ◯ | ⊙ | |
| T-type peel strength (Kg/inch) | | | | | | | | | | |
| Initial strength | 3.5 | 3.3 | 2.8 | 2.7 | 3.2 | 3.4 | 2.2 | 3.0 | 3.3 | 2.9 |
| At 20° C. after curing | 4.4 | 3.8 | 3.8 | 3.9 | 3.7 | 4.1 | 3.8 | 3.9 | 4.3 | 4.0 |
| At 80° C. after curing | 3.5 | 3.2 | 3.0 | 3.1 | 3.2 | 2.9 | 2.8 | 3.4 | 3.8 | 3.6 |

Example 27

10 parts of Califlex TRKX-65 (SBS, manufactured by Shell Chemical Co.), which is a styrene-based block copolymer resin, and serves as a thermoplastic resin (f), was dissolved in 40 parts of toluene, then 70 parts of 2-ethylhexyl acrylate, 20 parts of methyl methacrylate, 0.2 part of m-isopropenyl-$\alpha,\alpha'$-dimethylbenzyl isocyanate (manufactured by ACC Co.), as a monomer (c), and 0.2 part of t-hexyl peroxypivalate, as a polymerization initiator, were added to the solution, and polymerization was effected at a reaction temperature of 80° C. for 5 hours to prepare a graft copolymer $A_4$ solution.

The number-average molecular weight of this graft copolymer was about 64,000 and the glass transition temperature was about −45° C. At that time the isocyanate group content was about 0.04%. Separately, 20 parts of isobutyl acrylate, 80 parts of ethyl methacrylate, 5 parts of m-isopropenyl-$\alpha,\alpha'$-dimethylbenzyl isocyanate (manufactured by ACC Co.), as a monomer (c), and 10 parts of benzoyl peroxide, as a polymerization initiator, were added into 100 parts of toluene serving, as a solvent, and polymerization was effected at a reaction temperature of 100° C. for 5 hours, to prepare a low-molecular-weight polymer $E_1$ solution. The number-average molecular weight of this low-molecular-weight polymer was about 2,400 and the glass transition temperature was about 35° C. At that time the isocyanate group content was about 1.0%. The and diphenylmethane diisocyanate (MDI-PH, manufactured by Mitsui Toatsu Chemicals, Inc.) was reacted, so that the NCO/OH equivalent ratio would be about 2.0. This pressure-sensitive adhesive is a mixture of the graft copolymer $A_4$ and the low-molecular-weight polymer $E_3$. The results of the evaluation are shown in Table 5.

Example 29

An adhesive was prepared in the same manner as in Example 27, except that, instead of the m-isopropenyl-$\alpha, \alpha'$-dimethylbenzyl isocyanate of the graft copolymer, hydroxyethyl acrylate was used as a monomer (h), and diphenylmethane diisocyanate (MDI-PH, manufactured by Mitsui Toatsu Chemicals, Inc.) was reacted, so that the NCO/OH equivalent ratio would be about 2.0. This pressure-sensitive adhesive is a mixture of the graft copolymer $A_5$ and the low-molecular-weight polymer $E_1$. The results of the evaluation are shown in Table 5.

Example 30

The graft copolymer $A_4$ was obtained in the same way as that in Example 27. Separately, a low-molecular-weight polymer $E_2$ was obtained by melting 90 parts of Clearon P-105 (manufactured by Yasuhara Chemical Co.), as a hydrogenated terpene resin, 10 parts of m-isopropenyl-$\alpha,\alpha'$-dimethylbenzyl isocyanate (manufactured by ACC Co.), a monomer (c), and 0.3 part of dicumyl peroxide, as an organic peroxide, in a kneader at 140° C. and reacting them for 2 hours. The graft copolymer and the low-molecular-weight polymer were mixed, so that the weight ratio of the graft copolymer to the low-molecular-weight polymer would be about 70/30, and then 0.5% of dibutyltin laurate was added as a reaction accelerator, to obtain the intended product. The adhesion strength of the thus prepared pressure-sensitive adhesive and the change in melting viscosity of the pressure-sensitive adhesive were determined. The results of the evaluation are shown in Table 5.

Example 31

78 parts of n-butyl acrylate, 20 parts of a polystyrene having a methacryloyl group at its terminal (having a molecular weight of 13,000 and available under the trade name of CHEMLINK 4500 from SARTOMER Co.), as a macromer (a), 2 parts of 2-methacryloyloxyethyl isocyanate (manufactured by Showa Denko K.K.), as a monomer (c), and 0.4 part of $\alpha,\alpha'$-azobisisobutyronitrile, as a polymerization initiator, were added into 50 parts of ethyl acetate serving, as a solvent, and polymerization was effected at a reaction temperature of 70° C. for 5 hours, thereby preparing a graft copolymer $A_2$ solution. The number-average molecular weight of this graft copolymer was about 21,000 and the glass transition temperature of the alkyl (metha)acrylate portion was about $-52°$ C. The isocyanate group content was about 0.45%. Separately, 40 parts of n-butyl acrylate, 50 parts of methyl methacrylate, 10 parts of 2-methacryloyloxyethyl isocyanate (manufactured by Showa Denko K. K.), as a monomer (c), and 5 parts of benzoyl peroxide, as a polymerization initiator, were added into 100 parts of ethyl acetate, serving as a solvent, and the polymerization was effected at a reaction temperature of 100° C. for 5 hours, thereby preparing a low-molecular-weight polymer $E_1$ solution. The number-average molecular weight of this low-molecular-weight polymer was about 5,100 and the glass transition temperature was about 10° C. The isocyanate group content was about 2.7%. The above graft copolymer solution and the above low-molecular-weight polymer solution were mixed, so that the weight ratio of the graft copolymer and the low-molecular-weight polymer solution would be about 70/30, and the ethyl acetate was removed, to obtain the intended product. The bond strength of the thus prepared pressure-sensitive adhesive and the change in melting viscosity of the pressure-sensitive adhesive were measured. The results of the evaluation are shown in Table 5.

Example 32

74 parts of 2-ethylhexyl acrylate, 10 parts of methyl methacrylate, 15 parts of a styrene/acrylonitrile copolymer having a methacryloyl group at its terminal (having a molecular weight of 6,000; available under the trade name of AN-6 from Toagosei Chemical Industry Co., Ltd.), as a macromer (a), 1 part of m-isopropenyl-$\alpha,\alpha'$-dimethylbenzyl isocyanate (manufactured by ACC Co.), as a monomer (c), and 0.15 part of t-hexyl peroxypivalate, as a polymerization initiator, were added to 40 parts of toluene serving as a solvent, and polymerization was effected at a reaction temperature of 80° C. for 5 hours, to prepare a graft copolymer $A_2$ solution. The number-average molecular weight of this graft copolymer was about 8,000 and the glass transition temperature was about $-55°$ C. At that time the isocyanate group content was about 0.2%. Separately, 20 parts of isobutyl acrylate, 75 parts o of ethyl methacrylate, 5 parts of m-isopropenyl-$\alpha,\alpha'$-dimethylbenzyl isocyanate (manufactured by ACC Co.), as a monomer (c), and 10 parts of benzoyl peroxide, as a polymerization initiator, were added into 100 parts of toluene serving as a solvent, and polymerization was effected at a reaction temperature of 100° C. for 5 hours, to prepare a low-molecular-weight polymer $E_1$ solution. The number-average molecular weight of this low-molecular-weight polymer was about 2,700 and the glass transition temperature was about 30° C. At that time the isocyanate group content was about 1.0%. The above graft copolymer solution and the above low-molecular-weight polymer solution were mixed, so that the weight ratio of the graft copolymer/low-molecular-weight polymer would be about 60/40, then 0.5% of dibutyltin dilaurate, as a reaction accelerator, was added, and the toluene was removed, to obtain the intended product. The adhesion strength of the thus prepared pressure-sensitive adhesive and the change in melting viscosity of the pressure-sensitive adhesive were measured. The results of the evaluation are shown in Table 5.

Example 33

Example 31 was repeated, except that, instead of the 2-methacryloyloxyethyl isocyanate, hydroxyethyl acrylate was used as a monomer (h), and diphenylmethane diisocyanate (MDI-PH manufactured by Mitsui Toatsu Chemicals, Inc.), as a polyisocyanate (d), was reacted so that the NCO/OH equivalent ratio would be about 2.0, thereby preparing a pressure-sensitive adhesive. This pressure-sensitive adhesive is a mixture of the graft copolymer $A_3$ and the low-molecular-weight polymer $E_3$. The results of the evaluation are shown in Table 5.

Example 34

Example 32 was repeated, except that, instead of the m-isopropenyl-$\alpha,\alpha'$-dimethylbenzyl isocyanate, acrylic acid was used as a monomer (h), and polymethylenepolyphenyl polyisocyanate (MDI-CRUDE 200 manufactured by Mitsui Toatsu Chemicals, Inc.), as a polyisocyanate (d), was reacted so that the NCO/OH equivalent ratio would be about 2.0, thereby preparing a pressure-sensitive adhesive. This pressure-sensitive adhesive is a mixture of a graft copolymer $A_3$ and a low-molecular-weight polymer $E_3$. The results of the evaluation are shown in Table 5.

Example 35

100 parts of Kurapol P-2010 (3-methyl-1,5-pentanediol adipate having a molecular weight of 2,000; manufactured by Kuraray Co. Ltd.), which is a polyester polyol, and which serves as a polyol (j), and 25 parts of diphenylmethane diisocyanate (manufactured by Mitsui Toatsu Chemicals, Inc.), as a polyisocyanate (d), were added, and reaction carried out at 80° C. for 5 hours, thereby preparing a urethane prepolymer (B). At that time, the NCO/OH equivalent ratio was 2.0. 100 parts of the pressure-sensitive adhesive prepared in Example 31 and 20 parts of the above urethane prepolymer were melted and mixed, to obtain the intended product. The results of the evaluation are shown in Table 5.

Example 36

A pressure-sensitive adhesive was prepared in the same manner as in Example 32, except that, instead of the dibutyltin dilaurate, 1,3-dimethylimidazolidinone was used, thereby preparing a pressure-sensitive adhesive. 100 parts of the thus prepared pressure-sensitive adhesive and 15 parts of Super Ester A-100 (disproportional rosin glycerin ester manufactured by Arakawa Chemical Industry Co.), as a tackifier resin were melted and mixed, to obtain the intended product. The results of the evaluation are shown in Table 5.

Example 37

An adhesive was prepared in the same manner as in Example 31, except that, instead of polystyrene having a methacryloyl group at its terminal, available under the trade name of CHEMLINK 4500, the macromer 3 was used as a macromer (a), thereby preparing the intended product. The results of the evaluation are shown in Table 5.

Example 38

An intended adhesive was prepared in the same manner as in Example 32, except that, instead of polystyrene having a methacryloyl group at its terminal, available under the trade name of CHEMLINK 4500, the macromer 4 was used, as a macromer (a). The results of the evaluation are shown in Table 5.

Example 39

10 parts of Kranton G-1652 (SEBS, manufactured by Shell Chemical Co.), which is a styrene-based block copolymer resin, and which serves as a thermoplastic resin (f) was dissolved in 40 parts of toluene, then 74 parts of 2-ethylhexyl acrylate, 5 parts of methyl methacrylate, 10 parts of a styrene/acrylonitrile copolymer having a methacryloyl group at its terminal (having a molecular weight of 6,000; available under the trade name AN-6 from Toagosei Chemical Industry Co. Ltd.), as a macromer (a), 1 part of m-isopropenyl-$\alpha,\alpha'$-dimethylbenzyl isocyanate (manufactured by ACC Co.), as a monomer (c), and 0.3 part of t-hexyl peroxypivalate as a polymerization initiator were added to the solution, and polymerization was effected at a reaction temperature of 80° C. for 5 hours, to prepare a graft copolymer ($A_2+A_4$)) solution. The number-average molecular weight of this graft copolymer was about 48,000 and the glass transition temperature was about −56° C. At that time the isocyanate group content was about 0.2%. Separately, 20 parts of isobutyl acrylate, 75 parts of ethyl methacrylate, 5 parts of m-isopropenyl-$\alpha,\alpha'$-dimethylbenzyl isocyanate (manufactured by ACC Co.), as a monomer (c), and 10 parts of benzoyl peroxide, as a polymerization initiator, were added into 100 parts of toluene serving, as a solvent, and polymerization was effected at a reaction temperature of 100° C. for 5 hours, to prepare a low-molecular-weight polymer $E_1$ solution. The number-average molecular weight of this low-molecular-weight polymer was about 2,700 and the glass transition temperature was about 30° C. At that time the isocyanate group content was about 1.0%. The above graft copolymer solution and the above low-molecular-weight polymer solution were mixed, so that the weight ratio of the graft copolymer/low-molecular-weight polymer would be about 60/40, then 0.5% of dibutyltin dilaurate, as a reaction accelerator, was added, and the toluene was removed, to obtain the intended product. The adhesion strength of the thus prepared pressure-sensitive adhesive and the change in melting viscosity of the pressure-sensitive adhesive were measured. The results of the evaluation are shown in Table 5.

Example 40

The graft copolymer ($A_2+A_4$) was obtained similarly to Example 39. Separately, the low-molecular-weight polymer $E_2$ was obtained similarly to Example 30. The graft copolymer and the low-molecular-weight polymer were mixed, so that the weight ratio of the graft copolymer/low-molecular-weight polymer would be about 70/30, and then 0.5% of dibutyltin dilaurate, as a reaction accelerator, was added thereto, to obtain the intended product. The adhesion strength of the thus prepared pressure-sensitive adhesive and the change in melting viscosity of the pressure-sensitive adhesive were measured. The results of the evaluation are shown in Table 5.

Example 41

The graft copolymer ($A_2+A_4$) was obtained similarly to Example 39. Separately, 10 parts of Arkon P-100 (manufactured by Arakawa Chemical Industry Co.), which is a hydrogenated petroleum resin, was dissolved in 100 parts of toluene; then 20 parts of isobutyl acrylate, 65 parts of ethyl methacrylate, 5 parts of m-isopropenyl-$\alpha,\alpha'$-dimethylbenzyl isocyanate (manufactured by ACC Co.), as a monomer (c), and 10 parts of benzoyl peroxide, as a polymerization initiator, were added to the solution, and polymerization was effected at a reaction temperature of 100° C. for 5 hours, to prepare a low-molecular-weight polymer ($E_1+E_2$) solution. The number-average molecular weight of this low-molecular-weight polymer was about 2,500, and the glass transition temperature was about 30° C. At that time the isocyanate group content was about 1.0%. The above graft copolymer solution and the above low-molecular-weight polymer solution were mixed, so that the weight ratio of the graft copolymer/low-molecular-weight polymer would be about 60/40; then 0.5% of dibutyltin dilaurate, as a reaction accelerator, was added, and the toluene was removed, to obtain the intended product. The adhesion strength of the thus prepared pressure-sensitive adhesive and the change in melting viscosity of the pressure-sensitive adhesive were measured. The results of the evaluation are shown in Table 5.

Comparative Example 13

A pressure-sensitive adhesive was prepared in the same manner as in Example 27, except that the m-isopropenyl-$\alpha,\alpha'$-dimethylbenzyl isocyanate, as a monomer (c), was not used. The results of the evaluation are shown in Table 5.

Comparative Example 14

A pressure-sensitive adhesive was prepared in the same manner as in Example 31, except that the macromer was not used. The results of the evaluation are shown in Table 5.

Comparative Example 15

A pressure-sensitive adhesive was prepared in the same manner as in Example 32, except that the m-isopropenyl-$\alpha,\alpha'$-dimethylbenzyl isocyanate as a monomer (c) was not used. The results of the evaluation are shown in Table 5.

Comparative Example 16

74 parts of 2-ethylhexyl acrylate, 10 parts of methyl methacrylate, 15 parts of a styrene/acrylonitrile copolymer having a methacryloyl group at its terminal (having a molecular weight of 6,000; available under the trade name AN-6 from Toagosei Chemical Industry Co., Ltd.), as a macromer (a), 1 part of m-isopropenyl-$\alpha,\alpha'$-dimethylbenzyl isocyanate (manufactured by ACC Co.), as a monomer (c), and 0.15 parts of t-hexyl peroxypivalate, as a polymerization initiator, were added to 40 parts of toluene, serving as a solvent, and polymerization was effected at a reaction temperature of 80° C. for 5 hours, to prepare a graft copolymer solution. The number-average molecular weight of this graft copolymer was about 58,000, and the glass transition temperature was about −55° C. At that time the isocyanate group content was about 0.2%. Separately, 20 parts of isobutyl acrylate, 75 parts of ethyl methacrylate, 5 parts of m-isopropenyl-α,α'-dimethylbenzyl isocyanate (manufactured by ACC Co.), as a monomer (c), and 0.5 part of benzoyl peroxide, as a polymerization initiator, were added into 100 parts of toluene, serving as a solvent, and polymerization was effected at a reaction temperature of 100° C. for 5 hours, to prepare a low-molecular-weight polymer solution. The number-average molecular weight of this low-molecular-weight polymer was about 20,000, and the glass transition temperature was about 45° C. At that time the isocyanate group content was about 1.0%. The above graft copolymer solution and the above low-molecular-weight polymer solution were mixed, so that the weight ratio of the graft copolymer/low-molecular-weight polymer would be about 60/40; then 0.5% of dibutyltin dilaurate, as a reaction accelerator, was added, and the toluene was removed, to obtain the intended product. The adhesion strength of the thus prepared pressure-sensitive adhesive and the change in melting viscosity of the pressure-sensitive adhesive were measured. The results of the evaluation are shown in Table 5.

Comparative Example 17

A pressure-sensitive adhesive was prepared in the same manner as in Example 31, except that the low-molecular-weight polymer was not used. The results of the evaluation are shown in Table 5.

Comparative Example 18

A pressure-sensitive adhesive was prepared in the same manner as Example 32, except that the low-molecular-weight polymer was not used. The results of the evaluation are shown in Table 5.

TABLE 5

| | Example | | | | | | | | | | |
|---|---|---|---|---|---|---|---|---|---|---|---|
| | 27 | 28 | 29 | 30 | 31 | 32 | 33 | 34 | 35 | 36 | 37 |
| Graft copolymer | 80 | 80 | 80 | 70 | 70 | 60 | 70 | 60 | 70 | 60 | 70 |
| Low M.W. copolymer | 20 | 20 | 20 | 30 | 30 | 40 | 30 | 40 | 30 | 40 | 30 |
| Tackifier resin | — | — | — | — | — | — | — | — | — | 15 | — |
| Change in melting viscosity (cp) | | | | | | | | | | | |
| Temperature (°C.) | 150 | 150 | 150 | 150 | 120 | 120 | 120 | 120 | 120 | 120 | 120 |
| Initial | 63,000 | 70,000 | 85,000 | 30,000 | 64,000 | 60,000 | 75,000 | 89,000 | 43,000 | 42,000 | 75,000 |
| After 24 hrs. | 88,000 | 97,000 | 120,000 | 48,000 | 71,000 | 68,000 | 80,000 | 95,000 | 50,000 | 49,000 | 82,000 |
| 180° C. Peel strength (Kg/inch) | 1.2 | 1.1 | 0.9 | 1.3 | 1.2 | 1.1 | 1.2 | 1.3 | 0.9 | 0.9 | 1.1 |
| 20° C. retention force after 1 hr.*[4] | 3 | 3 | 2 | 2 | 4 | 3 | 3 | 4 | 3 | 3 | 6 |
| 40° C. retention force after 1 week*[4] | 24< | 24< | 24< | 24< | 24< | 24< | 24< | 24< | 24< | 20 | 24< |

| | Example | | | | Comparative Example | | | | | |
|---|---|---|---|---|---|---|---|---|---|---|
| | 38 | 39 | 40 | 41 | 13 | 14 | 15 | 16 | 17 | 18 |
| Graft copolymer | 60 | 60 | 70 | 60 | *[1]80 | *[2]70 | *[1]60 | 60 | 100 | 100 |
| Low M.W. copolymer | 40 | 40 | 30 | 40 | *[1]20 | 30 | *[1]40 | *[3]40 | None | None |
| Tackifier resin | — | — | — | — | — | — | — | — | — | — |
| Change in melting viscosity (cp) | | | | | | | | | | |
| Temperature (°C.) | 120 | 120 | 120 | 120 | 150 | 120 | 120 | 150 | 150 | 150 |
| Initial | 58,000 | 60,000 | 65,000 | 59,000 | 62,000 | 44,000 | 61,000 | 42,000 | 31,000 | 78,000 |
| After 24 hrs. | 68,000 | 75,000 | 81,000 | 69,000 | 80,000 | 50,000 | 63,000 | 500,000< | 500,000< | Gelation |
| 180° Peel strength (Kg/inch) | 1.0 | 1.2 | 1.1 | 1.1 | 0.2 | 1.1 | 0.2 | 0.1 | 0.2 | 0.4 |
| 20° C. retention force after 1 hr.*[4] | 3 | 2 | 2 | 3 | 2 | 1> | 2 | 3 | 1> | 3 |
| 40° C. retention after 1 week*[4] | 24< | 24< | 24< | 24< | 1> | 24< | 1> | 1> | 8 | 10 |

Note:
*[1]Not contained monomer (c)
*[2]Not contained macromer
*[3]High molecular weight
*[4]Retention force; designated by hours

Example 42

10 parts of Califlex TRKX-65 (SBS, manufactured by Shell Chemical Co.), which is a styrene-based block copolymer resin, and which serves as a thermoplastic resin was dissolved in 40 parts of toluene, then 70 parts of 2-ethylhexyl acrylate, 20 parts of methyl methacrylate, 0.2 parts of m-isopropenyl-α,α'-dimethylbenzyl isocyanate (manufactured by ACC Co.), and 0.2 part of t-hexyl peroxypivalate as a polymerization initiator were added to the solution, and polymerization was effected at a reaction temperature of 80° C. for 5 hours, to prepare a graft copolymer (A$_4$)) solution.

The number-average molecular weight of this graft copolymer was about 64,000 and the glass transition temperature was about −45° C.

Separately, 20 parts of isobutyl acrylate, 80 parts of ethyl methacrylate, and 10 parts of benzoyl peroxide, as a polymerization initiator, were added into 100 parts of toluene, serving as a solvent, and polymerization was effected at a reaction temperature of 100° C. for 5 hours, to prepare a low-molecular-weight polymer (B) solution. The number-average molecular weight of this low-molecular-weight polymer was about 2,400 and the glass transition temperature was about 25° C.

The above graft copolymer solution and the above low-molecular-weight polymer solution were mixed, so that the weight ratio of the graft copolymer/low-molecular-weight polymer would be about 80/20, then 0.02% of dibutyltin dilaurate, as a reaction accelerator, based on 100 parts of total weight of the graft copolymer and the low-molecular-weight polymer, was added and mixed, and the toluene was removed, to obtain the intended product. The results of the evaluation are shown in Table 6.

Example 43

To 50 parts of ethyl acetate, serving as a solvent, 78 parts of n-butyl acrylate, 20 parts of polystyrene having a methacryloyl group at its terminal (having a molecular weight of 13,000; available under the trade name CHEMLINK 4500 from SARTOMER Co.), as a macromer, 2 parts of 2-methacryloyloxyethyl isocyanate (manufactured by Showa Denko K.K.), and 0.4 parts of α,α′-azobisisobutyronitril, as a polymerization initiator, were added, and polymerization was effected at a reaction temperature of 70° C. for 5 hours, to prepare a graft copolymer ($A_2$) solution.

The number-average molecular weight of this graft copolymer was about 21,000, and the glass transition temperature was about −52° C.

Separately, 40 parts of n-butyl acrylate, 60 parts of methyl methacrylate, and 5 parts of benzoyl peroxide, as a polymerization initiator, were added into 100 parts ethyl acetate, serving as a solvent, and polymerization was effected at a reaction temperature of 100° C. for 5 hours, to prepare a low-molecular-weight polymer (B) solution.

The number-average molecular weight of this low-molecular-weight polymer was about 4,900, and the glass transition temperature was about 0° C. The above graft copolymer solution and the above low-molecular-weight polymer solution were mixed, so that the weight ratio of the graft copolymer/low-molecular-weight polymer would be about 70/30, and the ethyl acetate was removed, to obtain the intended product. The results of the evaluation are shown in Table 6.

Example 44

In 40 parts of toluene, serving as a solvent, 74 parts of 2-ethylhexyl acrylate, 10 parts of methyl methacrylate, 15 parts of (styrene-acrylonitrile) copolymer (tradename AN-6, manufactured by Toagosei Chemical Industry Co., Ltd. having a molecular weight of 6,000), having a methacryloyl group at its terminal, as a macromer, 1 part of m-isopropenyl-α,α′-dimethylbenzyl isocyanate (manufactured by ACC Co.), and 0.15 parts of t-hexyl peroxypivalate as a polymerization initiator were added and dissolved, and polymerization was effected at a reaction temperature of 80° C. for 5 hours, to prepare a graft copolymer ($A_2$) solution. The number-average molecular weight of this graft copolymer was about 58,000 and the glass transition temperature was about −55° C.

Separately, 40 parts of isobutyl acrylate, 55 parts of ethyl methacrylate, 5 parts of vinyl acetate, and 10 parts of benzoyl peroxide, as a polymerization initiator, were added into 200 parts of toluene serving, as a solvent, and polymerization was effected at a reaction temperature of 100° C. for 5 hours, to prepare a low-molecular-weight polymer (B) solution. The number-average molecular weight of this low-molecular-weight polymer was about 1,500 and the glass transition temperature was about −20° C.

The above graft copolymer solution and the above low-molecular-weight polymer solution were mixed, so that the weight ratio of the graft copolymer/low-molecular-weight polymer would be about 60/40, then 0.1% of dibutyltin dilaurate, as a reaction accelerator, based on 100 parts of total weight of the graft copolymer and the low-molecular-weight polymer, was added and mixed, and the toluene was removed, to obtain the intended product. The results of the evaluation are shown in Table 6.

Example 45

A pressure-sensitive adhesive was prepared in the same manner as Example 43, except that hydroxyethyl acrylate was used instead of 2-methacryloyloxyethyl isocyanate, and diphenylmethanediisocyanate (tradename MDI-PH, manufactured by Mitsui Toatsu Chemicals, Inc.), as a polyisocyanate was reacted so that the NCO/OH equivalent ratio would be about 2.0. This pressure-sensitive adhesive is a mixture of the graft copolymer ($A_3$) and the low-molecular-weight polymer (B). The results of the evaluation are shown in Table 6.

Example 46

10 parts of Kranton G-1652 (SEBS, manufactured by Shell Chemical Co.), which is a styrene-based block copolymer resin, and which serves as a thermoplastic resin was dissolved in 40 parts of toluene, then 74 parts of 2-ethylhexyl acrylate, 5 parts of methyl methacrylate, 10 parts of (styrene-acrylonitrile) copolymer (tradename AN-6, manufactured by Toagosei Chemical Industry Co., Ltd. having a molecular weight of 6,000), having a methacryloyl group at its terminal, as a macromer, 1 part of m-isopropenyl-α,α′-dimethylbenzyl isocyanate (manufactured by ACC Co.), and 0.3 part of t-hexyl peroxypivalate as a polymerization initiator were added to the solution, and polymerization was effected at a reaction temperature of 80° C. for 5 hours, to prepare a graft copolymer ($A_2+A_4$) solution.

The number-average molecular weight of this graft copolymer was about 48,000 and the glass transition temperature was about −56° C.

Separately, 20 parts of n-butyl acrylate, 80 parts of methyl methacrylate, and 10 parts of benzoyl peroxide, as a polymerization initiator, were added into 100 parts of toluene serving, as a solvent, and polymerization was effected at a reaction temperature of 100° C. for 5 hours, to prepare a low-molecular-weight polymer (B) solution. The number-average molecular weight of this low-molecular-weight polymer was about 2,800 and the glass transition temperature was about 20° C.

The above graft copolymer solution and the above low-molecular-weight polymer solution were mixed, so that the weight ratio of the graft copolymer/low-molecular-weight polymer would be about 60/40, then 0.1% of dibutyltin dilaurate, as a reaction accelerator, based on 100 parts of total weight of the graft copolymer and the low-molecular-weight polymer, was added and mixed, and the toluene was removed, to obtain the intended product. The results of the evaluation are shown in Table 6.

Example 47

A pressure-sensitive adhesive was prepared in the same manner as Example 42, except that acrylic acid was used instead of the m-isopropenyl-α,α'-dimethylbenzyl isocyanate, and diphenylmethanediisocyanate (MDI-PH, manufactured by Mitsui Toatsu Chemicals, Inc.), as a polyisocyanate, was reacted so that the NCO/OH equivalent ratio would be about 2.0, thereby preparing a pressure-sensitive adhesive. This pressure-sensitive adhesive is a mixture of a graft copolymer ($A_5$) and a low-molecular-weight polymer (B). The results of the evaluation are shown in Table 6.

TABLE 6

| | Example | | | | | |
|---|---|---|---|---|---|---|
| | 42 | 43 | 44 | 45 | 46 | 47 |
| Graft copolymer | 80 | 70 | 60 | 70 | 60 | 80 |
| Low m.w. polymer | 20 | 30 | 40 | 30 | 40 | 20 |
| Change in melting viscosity (cp) | | | | | | |
| Temperature (°C.) | 150 | 120 | 120 | 120 | 120 | 150 |
| Initial | 48000 | 38000 | 15000 | 41000 | 48000 | 52000 |
| After 24 hrs. | 53000 | 42000 | 22000 | 48000 | 55000 | 68000 |
| 180° Peel Strength (Kg/inch) | 1.2 | 1.3 | 1.2 | 1.3 | 1.3 | 1.1 |
| 20° C. retention force[1] after 1 hr. | 3 | 3 | 3 | 2 | 2 | 3 |
| 40° C. retention force[1] after 1 week | 24< | 24< | 24< | 24< | 24< | 24< |

Note;
[1]Retention force: designated by hours

Comparative Example 19

A pressure-sensitive adhesive was prepared in the same manner as Example 42, except that m-isopropenyl-α,α'-dimethylbenzyl isocyanate was not used. The results of the evaluation are shown in Table 7.

Comparative Example 20

A pressure-sensitive adhesive was prepared in the same manner as Example 43, except that the macromer was not used. The results of the evaluation are shown in Table 7.

Comparative Example 21

In 40 parts of toluene, serving as a solvent, 74 parts of 2-ethylhexyl acrylate, 10 parts of methyl methacrylate, 15 parts of (styrene-acrylonitrile) copolymer (tradename AN-6, manufactured by Toagosei Chemical Industry Co., Ltd. having a molecular weight of 6,000), having a methacryloyl group at its terminal, as a macromer, 1 part of m-isopropenyl-α,α'-dimethylbenzyl isocyanate (manufactured by ACC Co.), and 0.15 parts of t-hexyl peroxypivalate as a polymerization initiator were added and dissolved, and polymerization was effected at a reaction temperature of 80° C. for 5 hours, to prepare a graft copolymer ($A_2$) solution. The number-average molecular weight of this graft copolymer was about 58,000 and the glass transition temperature was about −55° C.

Separately, 40 parts of isobutyl acrylate, 55 parts of ethyl methacrylate, 5 parts of vinyl acetate, and 0.5 parts of benzoyl peroxide, as a polymerization initiator, were added into 100 parts of toluene, serving as a solvent, and polymerization was effected at a reaction temperature of 100° C. for 5 hours, to prepare a low-molecular-weight polymer solution. The number-average molecular weight of this low-molecular-weight polymer was about 20,000 and the glass transition temperature was about 20° C. The above graft copolymer solution and the above low-molecular-weight polymer solution were mixed, so that the weight ratio of the graft copolymer/low-molecular-weight polymer would be about 60/40, then 0.1% of dibutyltin dilaurate, as a reaction accelerator, based on 100 parts of total weight of the graft copolymer and the low-molecular-weight polymer, was added and mixed, and the toluene was removed, to obtain the intended product. The results of the evaluation are shown in Table 7.

Comparative Example 22

A pressure-sensitive adhesive was prepared in the same manner as Example 43, except that the low-molecular-weight polymer was not used. The results of the evaluation are shown in Table 7.

Comparative Example 23

A pressure-sensitive adhesive was prepared in the same manner as Example 43, except that styrene-series tackifier resin FTR-6110 (manufactured by Mitsui Petrochemical Co.) was used instead of the low-molecular-weight polymer (B). The results of the evaluation are shown in Table 7.

TABLE 7

| | Comparative Example | | | | |
|---|---|---|---|---|---|
| | 19 | 20 | 21 | 22 | 23 |
| Graft copolymer | 80[1] | 70[2] | 60 | 100 | 70 |
| Low m.w. polymer | 20 | 30 | 40[3] | None | 30[4] |
| Change in melting viscosity (cp) | | | | | |
| Temperature (°C.) | 150 | 120 | 150 | 150 | 120 |
| Initial | 48000 | 18000 | 40000 | 31000 | 25000 |
| After 24 hrs. | 53000 | 22000 | 55000 | 500000< | 35000 |
| 180° Peel strength (Kg/inch) | 0.5 | 1.1 | 0.1 | 0.2 | 0.4 |
| 20° C. retention force[5] after 1 hr. | 2 | 1> | 3 | 1> | 3 |
| 40° C. retention force[5] after 1 week | 1> | 20 | 1> | 8 | 24< |

Note;
[1]Graft copolymer not having an isocyanate group
[2]Not contained macromer
[3]High molecular weight
[4]Styrene-series tackifier resin
[5]Retention force: designated by hours

Example 48

Into 30 parts of toluene, serving as a solvent, 80 parts of 2-ethylhexyl acrylate, 20 parts of methyl methacrylate, 1.0 part of m-isopropenyl-α,α'-dimethylbenzyl isocyanate (manufactured by ACC Co.), and 0.2 parts of t-hexylperoxypivalate, as a polymerization initiator, were added, and polymerization was effected at a reaction temperature of 80° C. for 5 hours, thereby preparing a high-molecular-weight polymer ($D_1$) solution. The number-average molecular weight of this high-molecular-weight polymer was about 20,000, and the glass transition temperature was −50° C.

Separately, 20 parts of isobutyl acrylate, 80 parts of ethyl methacrylate, 5 parts of m-isopropenyl-α,α'-dimethylbenzyl isocyanate (manufactured by ACC Co.), and 10 parts of benzoylperoxide, as a polymerization initiator, were added into 100 parts of toluene, serving as a solvent, and polymerization was effected at a reaction temperature of 100° C. for 5 hours, thereby preparing a low-molecular-weight polymer ($E_1$) solution. The number-average molecular weight of this low-molecular-weight polymer was about 2,400, and the glass transition temperature was 35° C. The above high-molecular-weight polymer solution and the above low-molecular-weight polymer solution were mixed, so that the weight ratio of the high-molecular-weight polymer/low-molecular-weight polymer would be 80/20, and 0.1% of dibutyltindilaurate, as a reaction accelerator, based on total weight 100 parts of the high-molecular-weight polymer and low-molecular-weight polymer, was added and mixed, followed by removing toluene, to obtain the intended product. The results of the evaluation of this product are shown in Table 8.

Example 49

Into 50 parts of ethyl acetate, serving as a solvent, 100 parts of n-butyl acrylate, 1 part of Light acrylate 4EG-A (manufactured by Kyoei Sha Yushi Kagaku Co.), that is polyethyleneglycoldiacrylate, 2 parts of 2-methacryloyloxyethyl isocyanate (manufactured by Showa Denko Co.), and 0.2 parts of α,α'-azobisisobutyronitrile, as a polymerization initiator, were added, and polymerization was effected at a reaction temperature of 70° C. for 5 hours, thereby preparing a high-molecular-weight polymer ($D_1$) solution. The number-average molecular weight of this high-molecular-weight polymer was about 41,000, and the glass transition temperature was −53° C.

Separately, into 100 parts of ethyl acetate, serving as a solvent, 40 parts of n-butyl acrylate, 60 parts of methyl methacrylate, and 5 parts of benzoyl peroxide, as a polymerization initiator, were added, and polymerization was effected at a reaction temperature of 100° C. for 5 hours, thereby preparing a low-molecular-weight polymer (B) solution. The number-average molecular weight of this low-molecular-weight polymer was about 4,900, and the glass transition temperature was about 0° C. The above high-molecular-weight polymer solution and the above low-molecular-weight polymer solution were mixed, so that the weight ratio of the high-molecular-weight polymer/low-molecular-weight polymer would be 60/40, and the ethyl acetate was removed, to obtain the intended product. The results of the evaluation of this product are shown in Table 8.

Example 50

A pressure-sensitive adhesive was prepared in the same manner as Example 49, except that hydroxyethyl acrylate was used instead of 2-methacryloyloxyethyl isocyanate, and diphenylmethanediisocyanate (tradename MDI-PH, manufactured by Mitsui Toatsu Chemicals, Inc.), as a polyisocyanate was reacted so that the NCO/OH equivalent ratio would be about 2.0. This pressure-sensitive adhesive is a mixture of the high-molecular-weight polymer ($D_2$) and the low-molecular-weight polymer (B). The results of the evaluation are shown in Table 8.

Example 51

A pressure-sensitive adhesive was prepared in the same manner as Example 48, except that acrylic acid was used instead of m-isopropenyl-α,α'-dimethylbenzyl isocyanate (manufactured by ACC Co.), and diphenylmethanediisocyanate (tradename MDI-PH, manufactured by Mitsui Toatsu Chemicals, Inc.), as a polyisocyanate was reacted so that the NCO/OH equivalent ratio would be about 2.0. This pressure-sensitive adhesive is a mixture of the high-molecular-weight polymer ($D_2$) and the low-molecular-weight polymer ($E_3$). The results of the evaluation are shown in Table 8.

Example 52

50 parts of pressure-sensitive adhesive prepared in Example 48 and 50 parts of pressure-sensitive adhesive prepared in Example 49 were mixed, to obtain the intended product. This pressure-sensitive adhesive is a mixture of high-molecular-weight polymer ($D_1$) and low-molecular-weight polymer ($E_1$+B). THe results of the evaluation are shown in Table 8.

Example 53

Into 20 parts of toluene, serving as a solvent, 100 parts of n-butyl acrylate, 2 part of Light acrylate 4EG-A (manufactured by Kyoei Sha Yushi Kagaku Co.), that is polyethyleneglycoldiacrylate, 3 parts of 2-methacryloyloxyethyl isocyanate (manufactured by Showa Denko Co.), and 0.1 parts of α,α'-azobisisobutyronitrile, as a polymerization initiator, were added, and polymerization was effected at a reaction temperature of 70° C. for 5 hours, thereby preparing a high-molecular-weight polymer ($D_1$) solution. The number-average molecular weight of this high-molecular-weight polymer was about 62,000, and the glass transition temperature was −53° C.

Separately, into 100 parts of toluene, serving as a solvent, 60 parts of n-butyl acrylate, 40 parts of methyl methacrylate, and 10 parts of benzoyl peroxide, as a polymerization initiator, were added, and polymerization was effected at a reaction temperature of 100° C. for 5 hours, thereby preparing a low-molecular-weight polymer (B) solution. The number-average molecular weight of this low-molecular-weight polymer was about 2,500, and the glass transition temperature was about −30° C. The above high-molecular-weight polymer solution and the above low-molecular-weight polymer solution were mixed, so that the weight ratio of the high-molecular-weight polymer/low-molecular-weight polymer would be 50/50, and the toluene was removed, to obtain the intended product. The results of the evaluation of this product are shown in Table 8.

TABLE 8

| | Example | | | | | |
|---|---|---|---|---|---|---|
| | 48 | 49 | 50 | 51 | 52 | 53 |
| High m.w. polymer | 80 | 60 | 60 | 80 | 70 | 50 |
| Low m.w. polymer | 20 | 40 | 40 | 20 | 30 | 50 |
| Change in melting viscosity (cp) | | | | | | |
| Temperature (°C.) | 120 | 120 | 120 | 120 | 120 | 120 |
| Initial | 10000 | 12000 | 18000 | 15000 | 11000 | 22000 |
| After 24 hrs. | 15000 | 18000 | 28000 | 28000 | 16000 | 30000 |
| 180° Peel strength (Kg/inch) | 1.0 | 1.2 | 1.2 | 1.0 | 1.1 | 1.1 |
| Ball tack | 20 | 12 | 11 | 18 | 16 | 10 |
| 40° C. retention force[1] after 1 week | 24< | 15 | 16 | 24< | 18 | 15 |

Note;
[1]Retention force: designated by hours

Comparative Example 24

A pressure-sensitive adhesive was prepared in the same manner as Example 48, except that m-isopropenyl-α,α'-dimethylbenzyl isocyanate was not used. The results of the evaluation are shown in Table 9.

Comparative Example 25

A pressure-sensitive adhesive was prepared in the same manner as Example 49, except that the low-molecular-weight polymer was not used. The results of the evaluation are shown in Table 9.

Comparative Example 26

A pressure-sensitive adhesive was prepared in the same manner as Example 49, except that the weight ratio of high-molecular-weight polymer/low-molecular-weight polymer was 30/70. The results of the evaluation are shown in Table 9.

Comparative Example 27

In 40 parts of toluene, serving as a solvent, 74 parts of 2-ethylhexyl acrylate, 10 parts of methyl methacrylate, 15 parts of (styrene-acrylonitrile) copolymer (tradename AN-6, manufactured by Toagosei Chemical Industry Co., Ltd. having a molecular weight of 6,000), having a methacryloyl group at its terminal, as a macromer, 1 part of m-isopropenyl-α,α'-dimethylbenzyl isocyanate (manufactured by ACC Co.), and 0.15 parts of t-hexyl peroxypivalate as a polymerization initiator were added and dissolved, and polymerization was effected at a reaction temperature of 80° C. for 5 hours, to prepare a graft copolymer solution. The number-average molecular weight of this graft copolymer was about 58,000 and the glass transition temperature was about −55° C.

Separately, 100 parts of toluene, serving as a solvent, 40 parts of isobutyl acrylate, 55 parts of ethyl methacrylate, 5 parts of vinyl acetate, and 5 parts of benzoyl peroxide, as a polymerization initiator, were added, and polymerization was effected at a reaction temperature of 100° C. for 5 hours, to prepare a low-molecular-weight polymer solution. The number-average molecular weight of this low-molecular-weight polymer was about 4,000 and the glass transition temperature was about 0° C. The above graft copolymer solution and the above low-molecular-weight polymer solution were mixed, so that the weight ratio of the graft copolymer/low-molecular-weight polymer would be about 60/40, then 0.1% of dibutyltin dilaurate, as a reaction accelerator, based on 100 parts of total weight of the graft copolymer and the low-molecular-weight polymer, was added and mixed, and the toluene was removed, to obtain the intended product. The results of the evaluation are shown in Table 9.

TABLE 9

| | Comparative Example | | | |
|---|---|---|---|---|
| | 24 | 25 | 26 | 27 |
| Graft copolymer | 80*[1] | 100 | 30 | 60*[2] |
| Low m.w. copolymer | 20 | None | 70 | 40 |
| Change in melting viscosity (cp) | | | | |
| Temperature (°C.) | 120 | 120 | 120 | 120 |
| Initial | 10000 | 68000 | 5000 | 25000 |
| After 24 hrs. | 13000 | 92000 | 9000 | 35000 |
| 180° Peel strength (Kg/inch) | 0.1 | 0.6 | 0.4 | 1.2 |
| 40° C. retention force*[3] after 1 week | 1> | 20 | 1> | 24< |

Note;
*[1]high-molecular-weight not having an isocyanate group
*[2]contained macromer (graft copolymer)
*[3]Retention force: designated by hours Having described our invention as related to the present embodiments, it is our intention that the invention not be limited by any of the details of the description, unless otherwise specified, but rather be construed broadly within its spirit and scope as set out in the accompanying claims.

What we claim is:

1. A resin composition which comprises 10 to 90 parts by weight of at least one polymer selected from the group consisting of graft copolymer $A_1$, graft copolymer $A_2$, graft copolymer $A_3$, graft copolymer $A_4$ and graft copolymer $A_5$, shown below, having at least one isocyanate group and a number-average molecular weight of 10,000 to 200,000, and 90 to 10 parts by weight of at least one low molecular weight polymer selected from the group consisting of low molecular weight polymer $E_1$, low molecular weight polymer $E_2$ and low molecular weight polymer $E_3$, shown below, having at least one isocyanate group and a number-average molecular weight of 500 to 8,000:

1) graft copolymers $A_1$ to $A_5$;
     1-1) graft copolymer $A_1$ having at least one isocyanate group prepared by graft polymerizing a monomer (c) having a vinyl group and an isocyanate group in the molecule on a thermoplastic resin (f);
     1-2) graft copolymer $A_2$ having at least one isocyanate group prepared by copolymerizing a monomer (c) having a vinyl group and an isocyanate group in the molecule, a macromer (a) having a vinyl group at the end of the molecule having a number-average molecular weight of more than 2,000 and a glass transition temperature above 20° C., and an alkyl (meth)acrylate (b) having an alkyl group of 1 to 12 carbon atoms, and having a glass transition temperature of −75° C. to −20° C. for the alkyl (meth) acrylate portion;

1-3) graft copolymer $A_3$ having at least one isocyanate group prepared by copolymerizing a monomer (h) having a vinyl group and an active hydrogen in the molecule, above described macromer (a), and alkyl (meth)acrylate (b) having an alkyl group of 1 to 12 carbon atoms, and further reacting with a polyisocyanate (d), and having a glass transition temperature of $-75°$ C. to $-20°$ C. for the alkyl (meth) acrylate portion;

1-4) graft copolymer $A_4$ having at least one isocyanate group prepared by copolymerizing a monomer (c) having a vinyl group and an isocyanate group in the molecule and alkyl (meth)acrylate (b) having an alkyl group of 1 to 12 carbon atoms, in the presence of a thermoplastic resin (f), and having a glass transition temperature of $-75°$ C. to $-20°$ C. for the alkyl (meth)acrylate portion;

1-5) graft copolymer $A_5$ having at least one isocyanate group prepared by copolymerizing a monomer (h) having a vinyl group and active hydrogen in the molecule and alkyl (meth)acrylate (b) having an alkyl group of 1 to 12 carbon atoms, in the presence of said thermoplastic resin (f), and further reacting with a polyisocyanate (d), and having a glass transition temperature of $-75°$ C. to $-20°$ C. for the alkyl (meth)acrylate portion;

2) low-molecular-weight polymers $E_1$ to $E_3$;

2-1) low-molecular-weight polymer $E_1$ having at least one isocyanate group prepared by reacting the above-described monomer (c), at least one monomer (g) selected from the group consisting of vinyl acetate, and alkyl (meth)acrylate (b) having an alkyl group of 1 to 12 carbon atoms and having a glass transition temperature of $-40°$ C. to $100°$ C.;

2-2) low-molecular-weight polymer $E_2$ having at least one isocyanate group prepared by graft polymerizing the above-described monomer (c) on a petroleum resin, hydrogenated petroleum resin, terpene resin or hydrogenated terpene resin, and having a glass transition temperature of $-20°$ C. to $100°$ C.;

2-3) low-molecular-weight polymer $E_3$ having at least one isocyanate group prepared by copolymerizing the above-described monomer (h) and at least one monomer (g) selected from the group consisting of vinyl acetate and above-described monomer (b), and then reacting this copolymer with polyisocyanate (d), and having a glass transition temperature of $-40°$ C. to $100°$ C.;

and further comprising a urethane prepolymer (B), prepared by reacting a polyol (e) and a polyisocyanate (d) in an NCO/OH equivalent ratio of 1.4 to 5.0, present in an amount of less than 50% by weight of the resin composition.

2. The resin composition of claim 1, wherein the polyol (e) is at least one polyol selected from the group consisting of polyether polyol, polyester polyol, polycarbonate polyol, polybutylene polyol, polybutadiene polyol, polyisoprene polyol, hydrogenated polybutadiene polyol, hydrogenated polyisoprene polyol, castor oils and tall oils.

3. The resin composition of claim 1, wherein the polyisocyanate (d) is at least one compound selected from the group consisting of tolylenediisocyanate, hydrogenareal tolylenediisocyanate, diphenylmethanediisocyanate, hydrogenated diphenylmethane diisocyanate, hexamethylene diisocyanate, isophorone diisocyanate, naphthalene diisocyanate and polymethylene polyphenyl polyisocyanate.

4. A resin composition which comprises 50 to 90 parts by weight of at least one polymer selected from the group consisting of graft copolymer $A_2$, graft copolymer $A_3$, graft copolymer $A_4$ and graft copolymer $A_5$, shown below, having at least one isocyanate group and a number-average molecular weight of 10,000 to 200,000, and 50 to 10 parts by weight of a low-molecular-weight polymer (B), shown below, not having an isocyanate group and having a number-average molecular weight of 500 to 8,000:

1) graft copolymers $A_2$ to $A_5$;

1-1) graft copolymer $A_2$ having at least one isocyanate group prepared by graft polymerizing a monomer (c) having a vinyl group and an isocyanate group in the molecule, a macromer (a) having a vinyl group at the end of the molecule, having a number-average molecular weight of more than 2,000 and a glass transition temperature above $20°$ C., and an alkyl (meth)acrylate (b) having an alkyl group of 1 to 12 carbon atoms, and having a glass transition temperature of $-75°$ C. to $-20°$ C. for the alkyl (meth) acrylate portion;

1-3) graft copolymer $A_3$ having at least one isocyanate group prepared by copolymerizing a monomer (h) having a vinyl group and an active hydrogen in the molecule, above described macromer (a) having a vinyl group at the end of the molecule, having a number-average molecular weight of more than 2,000, and a glass transition temperature above $20°$ C., and alkyl (meth)acrylate (b) having an alkyl group of 1 to 12 carbon atoms, and further reacting with a polyisocyanate (d), and having a glass transition temperature of $-75°$ C. to $-20°$ C. for the alkyl (meth)acrylate portion; 1-4) graft copolymer $A_4$ having at least one isocyanate group prepared by copolymerizing a monomer (c) having a vinyl group and an isocyanate group in the molecule and alkyl (meth)acrylate (b) having an alkyl group of 1 to 12 carbon atoms, in the presence of a thermoplastic resin (f), and having a glass transition temperature of $-75°$ C. to $-20°$ C. for the alkyl (meth)acrylate portion;

1-5) graft copolymer $A_5$ having at least one isocyanate group prepared by copolymerizing a monomer (h) having a vinyl group and active hydrogen in the molecule and alkyl (meth)acrylate (b) having an alkyl group of 1 to 12 carbon atoms, in the presence of said thermoplastic resin (f), and further reacting with a polyisocyanate (d), and having a glass transition temperature of $-75°$ C. to $-20°$ C. for the alkyl (meth)acrylate portion;

2) low-molecular-weight polymer (B);

low-molecular-weight polymer (B), not having an isocyanate group, prepared by polymerizing at least one monomer (g) selected from the group consisting of vinyl acetate and alkyl (meth)acrylate (b) having an alkyl group of 1 to 12 carbon atoms and having a glass transition temperature of $-40°$ C. to $80°$ C.

5. A resin composition which comprises 40 to 90 parts by weight of at least one polymer selected from the group consisting of high-molecular-weight polymers $D_1$ and $D_2$, shown below, having at least one isocyanate group and a number-average molecular weight of 10,000 to 200,000, and 60 to 10 parts by weight of a low-molecular-weight polymer (E) or (B), shown below, not having an isocyanate group and having a number-average molecular weight of 500 to 8,000:

1) high-molecular-weight polymers (D);

1-1) high-molecular-weight polymer $D_1$ having at least one isocyanate group prepared by copolymerizing a monomer (c) having a vinyl group and an isocyanate group in the molecule, and alkyl (meth)acrylate (b)

having an alkyl group of 1 to 12 carbon atoms, and having a glass transition temperature of −75° C. to −20° C. for the alkyl (meth)acrylate portion;

1-2) high-molecular-weight polymer $D_2$ having at least one isocyanate group prepared by copolymerizing a monomer (h) having a vinyl group and an active carbon in the molecule, and an alkyl (meth)acrylate (b) having an alkyl group of 1 to 12 carbon atoms, and further reacting with a polyisocyanate (d), and having a glass transition temperature of −75° C. to −20° C. for the alkyl (meth)acrylate portion;

2) low-molecular-weight polymer $(E_1)$ or (B);

2-1) low-molecular-weight polymer $(E_1)$, having at least one isocyanate group prepared by copolymerizing a monomer (c) having a vinyl group and an isocyanate group in the molecule and at least one monomer (g) selected from the group consisting of vinylacetate and alkyl (meth)acrylate (b) having an alkyl group of 1 to 12 carbon atoms, and having a glass transition temperature of −40° C. to 100° C.;

2-2) low-molecular-weight polymer $(E_3)$, having at least one isocyanate group prepared by copolymerizing a monomer (h) having a vinyl group and an active hydrogen in the molecule and at least one monomer (g) selected from the group consisting of vinylacetate and alkyl (meth)acrylate (b) having an alkyl group of 1 to 12 carbon atoms and then reacting this copolymer with polyisocyanate (d), and having a glass transition temperature of −40° C. to 100° C.;

2-3) low-molecular-weight polymer (B), not having an isocyanate group, prepared by polymerizing at least one monomer (g) selected from the group consisting of vinyl acetate and alkyl (meth)acrylate (b) having an alkyl group of 1 to 12 carbon atoms and having a glass transition temperature of −40° C. to 80° C.

6. The resin composition of claim 5, wherein the high-molecular-weight polymer D is polymer $D_1$, having at least one isocyanate group, prepared by copolymerizing 0.05 to 10% by weight of monomer (c) having a vinyl group and an isocyanate group in the molecule, and 99.95 to 90% by weight of alkyl (meth) acrylate (b) having an alkyl group of 1 to 12 carbon atoms.

7. The resin composition of claim 5, wherein the high-molecular-weight polymer D is polymer $D_2$, having at least one isocyanate group, prepared by copolymerizing 0.05 to 10% by weight of monomer (h) having a vinyl group and an active hydrogen, and 99.85 to 70% by weight of alkyl (meth)acrylate (b) having an alkyl group of 1 to 12 carbon atoms, and then reacting the resultant copolymer with 0.1 to 20% by weight of said polyisocyanate (d).

8. The resin composition of claim 1, wherein the NCO/OH equivalent ratio for prepolymer (B) is 1.4 to 4.0.

9. The resin composition of claim 1, wherein urethane prepolymer (B) is present in an amount of 20 to less than 100 parts by weight per 100 parts by weight of the balance of the resin composition.

10. The resin composition of claim 1, wherein the graft copolymer, $A_1$, $A_2$, $A_3$, $A_4$ or $A_5$, having at least one isocyanate group has an isocyanate group content of 0.01 to 10% by weight, and the low-molecular-weight polymer, $E_1$, $F_2$ or $E_3$, having at least one isocyanate group has an isocyanate group content of 0.02 to 10% by weight.

11. The resin composition of claim 1, wherein the graft copolymer having at least one isocyanate group is graft copolymer $A_2$, and is prepared by copolymerizing 0.05 to 40% by weight of said monomer (c) having a vinyl group and an isocyanate group in the molecule, 2 to 50% by weight of said macromer (a), and 97.95 to 30% by weight of said alkyl (meth)acrylate (b).

12. The resin composition of claim 1, wherein the graft copolymer having at least one isocyanate group is graft copolymer $A_3$, and is prepared by copolymerizing 0.05 to 40 % by weight of said monomer (h) having a vinyl group and an active hydrogen in the molecule, 2 to 50% by weight of said macromer (a), and 97.85 to 30% by weight of said alkyl (meth)acrylate (b), and then reacting the resultant copolymer with 0.1 to 50% by weight of polyisocyanate (d).

13. The resin composition of claim 1, wherein the graft copolymer having at least one isocyanate group is graft copolymer $A_4$, and is prepared by copolymerizing 0.05 to 40 % by weight of said monomer (c) having a vinyl group and an isocyanate group in the molecule and 96.95 to 30% by weight of said alkyl (meth)acrylate (b), in the presence of 3 to 50% by weight of said thermoplastic resin (f).

14. The resin composition of claim 1, wherein the graft copolymer having at least one isocyanate group is graft copolymer $A_5$, and is prepared by copolymerizing 0.05 to 40% by weight of said monomer (h) having a vinyl group and active hydrogen in the molecule and 96.85 to 30% by weight of said alkyl (meth)acrylate (b), in the presence of 3 to 50% by weight of thermoplastic resin (f) and then reacting the resultant copolymer with 0.1 to 50% by weight of said polyisocyanate (d).

15. The resin composition of claim 1, wherein the low-molecular-weight polymer having at least one isocyanate group is low-molecular-weight polymer $E_1$, and is prepared by copolymerizing 0.05 to 50% by weight of said monomer (c) having a vinyl group and an isocyanate group in the molecule and 99.95 to 50% by weight of at least one monomer selected from the group consisting of vinyl acetate and said alkyl (meth)acrylate (b).

16. The resin composition of claim 1, wherein the low-molecular-weight polymer having at least one isocyanate group is low-molecular-weight polymer $E_3$, and is prepared by copolymerizing 0.05 to 50% by weight of said monomer (h) having a vinyl group and an active hydrogen in the molecule, and 99.85 to 30 % by weight of at least one monomer selected from the group consisting of vinyl acetate and said alkyl (meth)acrylate (b), and then reacting the resultant copolymer with 0.1 to 50% by weight of said polyisocyanate (d).

\* \* \* \* \*